US 12,093,253 B2

(12) United States Patent
Galitsky

(10) Patent No.: US 12,093,253 B2
(45) Date of Patent: Sep. 17, 2024

(54) SUMMARIZED LOGICAL FORMS BASED ON ABSTRACT MEANING REPRESENTATION AND DISCOURSE TREES

(71) Applicant: Oracle International Corporation, Redwood Shores, CA (US)

(72) Inventor: Boris Galitsky, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 555 days.

(21) Appl. No.: 16/996,065

(22) Filed: Aug. 18, 2020

(65) Prior Publication Data

US 2021/0191938 A1 Jun. 24, 2021

Related U.S. Application Data

(60) Provisional application No. 62/950,742, filed on Dec. 19, 2019.

(51) Int. Cl.
*G06F 17/00* (2019.01)
*G06F 16/2452* (2019.01)
(Continued)

(52) U.S. Cl.
CPC .... *G06F 16/24522* (2019.01); *G06F 16/9024* (2019.01); *G06F 40/289* (2020.01);
(Continued)

(58) Field of Classification Search
CPC ............ G06N 20/00; G06N 5/02; G06N 5/01; G06N 5/022; G06N 5/025; G06F 16/00;
(Continued)

(56) References Cited

U.S. PATENT DOCUMENTS 8,306,967 B2 11/2012 Galitsky et al.
9,378,239 B1 6/2016 Long et al.
(Continued)

OTHER PUBLICATIONS

He, Shizhu, et al. "Question answering over linked data using first-order logic." Proceedings of the 2014 Conference on Empirical Methods in Natural Language Processing (EMNLP). 2014. (Year: 2014).*

(Continued)

*Primary Examiner* — Michael Ortiz-Sanchez
(74) *Attorney, Agent, or Firm* — Kilpatrick Townsend & Stockton LLP

(57) ABSTRACT

Systems, devices, and methods discussed herein provide improved autonomous agent applications that are configured to generate automated answers to a question using summarized logical forms (SLFs). A myriad of techniques may be utilized to generate one or more summarized logical forms for an answer, where the summarized logical form(s) identifies the main entities/informative portions of the answer. Instead of indexing the whole of the answer as in conventional methods, an answer can be indexed using the summarized logical forms. A subsequent query may be converted to logical form to generate a query representation which can be compared to one or more SLFs of a set of answers. If an SLF of an answer matches the query representation, the answer may be provided in response to the question. By indexing the answer with its informative portions, the speed and accuracy of identifying the answer is improved.

17 Claims, 11 Drawing Sheets

(51) Int. Cl.

| | |
|---|---|
| *G06F 16/901* | (2019.01) |
| *G06F 40/289* | (2020.01) |
| *G06F 40/30* | (2020.01) |
| *G06N 5/01* | (2023.01) |
| *G06N 5/025* | (2023.01) |
| *G06N 20/00* | (2019.01) |

(52) U.S. Cl.
CPC .............. *G06F 40/30* (2020.01); *G06N 5/01* (2023.01); *G06N 5/025* (2013.01); *G06N 20/00* (2019.01)

(58) Field of Classification Search
CPC .... G06F 16/90; G06F 16/904; G06F 16/9024; G06F 16/24; G06F 16/242; G06F 16/245; G06F 16/2452; G06F 16/24522; G06F 16/24526; G06F 16/24534; G06F 40/00; G06F 40/10; G06F 40/30; G06F 40/20; G06F 40/289; G06F 18/20; G06F 18/28; G06F 40/205; G06F 40/211; G06F 40/216; G06F 40/226; G06F 40/253; G06F 16/83; G06F 16/84; G06F 16/838; G06F 16/835; G06F 16/8365; G06F 16/903; G06F 16/9032; G06F 16/90332; G06F 16/90335; G06F 16/9038; G06F 40/279; G06F 40/35; G06F 16/20
See application file for complete search history.

(56) References Cited

U.S. PATENT DOCUMENTS

| | | | |
|---|---|---|---|
| 9,836,529 | B2 | 12/2017 | Zelevinsky et al. |
| 10,699,708 | B2 | 6/2020 | Lecue et al. |
| 11,295,393 | B1* | 4/2022 | Orphys ................... G06F 8/313 |
| 11,386,176 | B2 | 7/2022 | Galitsky |
| 11,599,725 | B2 | 3/2023 | Galitsky |
| 2004/0024739 | A1* | 2/2004 | Copperman ........ G06F 16/3338 707/E17.084 |
| 2004/0117173 | A1* | 6/2004 | Ford ....................... G06F 40/30 707/E17.02 |
| 2015/0185996 | A1 | 7/2015 | Brown et al. |
| 2016/0012126 | A1 | 1/2016 | Franceschini et al. |
| 2016/0147871 | A1* | 5/2016 | Kalyanpur ............ G06F 40/205 707/728 |
| 2017/0139991 | A1 | 5/2017 | Teletia et al. |
| 2018/0060359 | A1 | 3/2018 | Li et al. |
| 2018/0129739 | A1 | 5/2018 | Jones et al. |
| 2018/0260472 | A1 | 9/2018 | Kelsey et al. |
| 2018/0357221 | A1* | 12/2018 | Galitsky ............... G06F 40/289 |
| 2019/0199658 | A1 | 6/2019 | Kim et al. |
| 2019/0212879 | A1* | 7/2019 | Anand .................. G06Q 50/10 |
| 2019/0378019 | A1 | 12/2019 | Scheutz et al. |
| 2020/0028803 | A1 | 1/2020 | Helmy |
| 2020/0114207 | A1 | 4/2020 | Weldemariam et al. |
| 2022/0121884 | A1 | 4/2022 | Zadeh et al. |

OTHER PUBLICATIONS

Artzi et al., "Broad-coverage CCG Semantic Parsing with AMR", Empirical Methods in Natural Language Processing, Sep. 2015, pp. 1699-1710.
Cai et al., "Smatch: An evaluation metric for semantic feature structures", In Proceedings of the 51st Annual Meeting of the Association for Computational Linguistics (vol. 2: Short Papers), 2013, pp. 748-752.
Damonte et al., "An Incremental Parser for Abstract Meaning Representation", Proceedings of EACL, 2017, pp. 1-12.
Eremeev et al., "Semantic-Based Text Complexity Measure", RANLP, Sep. 2019, pp. 1-6.
Galitsky, "Natural language question answering system: technique of semantic headers", Advanced Knowledge International, 2003.
Galitsky, "A Content Management System for Chatbots", Developing Enterprise Chatbots, Apr. 5, 2019, pp. 253-326.
Galitsky et al., "Inferring the Semantic Properties of Sentences Mining Syntactic Parse Trees", Data & Knowledge Engineering, November-Dec. 2012, pp. 21-45, vols. 81-82.
Greene et al., "Browsing publication data using tag clouds over concept lattices constructed by key-phrase extraction" RuZA Workshop. Proceedings of EACL, 2015, pp. 1-13.
Joty et al., "Combining intra-and multi- sentential rhetorical parsing for document-level discourse analysis", In ACL (1), 2013, pp. 486-496.
Nie et al., DisSent: Sentence Representation Learning from Explicit Discourse Relations. ArXiv, 2017, pp. 1-14.
Ourioupina et al., "Application of default reasoning to semantic processing under question-answering", DIMACS Tech Report 16, May 2001.
Palmer, "Semlink: Linking propbank, verbnet and framenet", In Proceedings of the generative lexicon conference, Sep. 17, 2009, pp. 1-54.
Surdeanu et al., "Two Practical Rhetorical Structure Theory Parsers", Proceedings of the Conference of the North American Chapter of the Association for Computational Linguistics—Human Language Technologies: Software Demonstrations (NAACL HLT), 2015, pp. 1-5.
Werling et al., Robust subgraph generation improves abstract meaning representation parsing. In Proceedings of the 53rd Annual Meeting of the ACL, Jun. 10, 2015, pp. 982-991.
Zong et al., "An answer extraction method based on discourse structure and rank learning", 7th International Conference on Natural Language Processing and Knowledge Engineering (NLP-KE), 2011, pp. 1-8.
U.S. Appl. No. 09/756,722, System, Method, and Computer Program Product for Responding To Natural Language Queries filed Jan. 10, 2001, 124 pages.
U.S. Appl. No. 16/426,878, Automated Building of Expanded Datasets for Training of Autonomous Agents filed May 30, 2019, 104 pages.
U.S. Appl. No. 16/983,993, First Action Interview Pilot Program Pre-Interview Communication mailed Jan. 13, 2022, 4 pages.
Amiridze et al., Anti-Unification and Natural Language Processing, Fifth Workshop on Natural Language and Computer Science, Easy Chair Preprint No. 203, May 31, 2018, 12 pages.
Baral, Knowledge Representation, Reasoning and Declarative Problem Solving, Cambridge University Press, 2003, pp. 233-237.
Baral et al., Using Answer Set Programming to Answer Complex Queries, In: Workshop on pragmatics of question answering at HLT-NAAC2004, 2004, 6 pages.
Bovi et al., Large-scale Information Extraction from Textual Definitions through Deep Syntactic and Semantic Analysis, Transactions of the Association for Computational Linguistics, vol. 3, Oct. 2015, pp. 529-543.
Cho et al., Paraphrase Generation for Semi-Supervised Learning in NLU, In Proceedings of the Workshop on Methods for Optimizing and Evaluating Neural Language Generation, Jun. 6, 2019, pp. 45-54.
De Cao, Question Answering by Reasoning Across Documents with Graph Convolutional Networks, Proceedings of the 2019 Conference of the North American Chapter of the Association for Computational Linguistics: Human Language Technologies, vol. 1, Jun. 2019, 12 pages.
Emani et al., NALDO: From Natural Language Definitions to OWL Expressions, Data and Knowledge Engineering, Elsevier, Jun. 9, 2019, 30 pages.
Galitsky, A Tool for Efficient Content Compilation, Proceedings of Coling 2016, the 26th International Conference on Computational Linguistics: System Demonstrations, Dec. 11-17, 2016, pp. 198-202.
Galitsky, A Tool for Extension and Restructuring Natural Language Question Answering Domains, International Conference on Industrial, Engineering and Other Applications of Applied Intelligent Systems, Jun. 2002, pp. 482-492.

(56) References Cited

OTHER PUBLICATIONS

Galitsky et al., Applying Hybrid Reasoning to Mine For Associative Features In Biological Data, Journal of Biomedical Informatics, vol. 40, Issue 3, Jun. 2007, pp. 203-220.
Galitsky, Building a Repository of Background Knowledge Using Semantic Skeletons, Association for the Advancement of Artificial Intelligence Spring Symposium Series, Jan. 2006, 6 pages.
Galitsky, Disambiguation Via Default Rules Under Answering Complex Questions, International Journal of Artificial Intelligence Tools, vol. 14, No. 1-2, 2004, 18 pages.
Galitsky, Financial Advisor: Technique of Semantic Headers, iAskWeb, Inc., 2001, 6 pages.
Galitsky et al., Finding Maximal Common Sub-Parse Thickets for Multi-Sentence Search, Graph Structures for Knowledge Representation and Reasoning, Jan. 2014, 19 pages.
Galitsky et al., From Generalization of Syntactic Parse Trees to Conceptual Graphs, Proceedings of the 18th international conference on Conceptual structures: from information to intelligence, Jul. 2010, pp. 185-190.
Galitsky, Generalization of Parse Trees for Iterative Taxonomy Learning, Information Sciences, vol. 329, Sep. 21, 2015, 43 pages.
Galitsky et al., Improving Web Search Relevance with Learning Structure of Domain Concepts, Clusters, Orders, and Trees: Methods and Applications, May 2014, 37 pages.
Galitsky, Learning Discourse-Level Structures for Question Answering, Developing Enterprise Chatbots, Apr. 5, 2019, pp. 177-219.
Galitsky, Least General Generalization of the Linguistic Structures, FCA4A workshop at IJCAI, 2019, 5 pages.
Galitsky, Matching Parse Thickets for Open Domain Question Answering, Data & Knowledge Engineering, vol. 107, Dec. 9, 2016, pp. 24-50.
Galitsky et al., Matching Sets of Parse Trees for Answering Multi-Sentence Questions, Proceedings of Recent Advances in Natural Language Processing, Sep. 2013, pp. 285-293.
Galitsky, Merging Deductive and Inductive Reasoning for Processing Textual Descriptions of Inter-Human Conflicts, Journal of Intelligent Information Systems, vol. 27, No. 1, Jul. 2006, pp. 21-48.
Galitsky, Natural Language Understanding with the Generality Feedback, Discrete Mathematics and Theoretical Computer Science Technical Report 99-32, Jun. 1999, pp. 1-21.
Galitsky et al., On a Chatbot Providing Virtual Dialogues, Proceedings of Recent Advances in Natural Language Processing, Sep. 2-4, 2019, pp. 382-387.
Galitsky et al., Parse Thicket Representations for Answering Multi-Sentence Search, International Conference on Conceptual Structures, vol. 7735, Jan. 2013, 13 pages.
Galitsky, Reasoning Beyond the Mental World, Computational Autism, Oct. 2016, pp. 215-244.
Galitsky et al., Rhetoric Map of an Answer to Compound Queries, Proceedings of the 53rd Annual Meeting of the 20 Association for Computational Linguistics and the 7th International Joint Conference of Natural Language Processing, vol. 2, Jul. 26-31, 2015, pp. 681-686.
Galitsky, Technique of Semantic Headers for Answering Questions in Tax Domain, iAskWeb, Inc., 6 pages.
Galitsky, Technique of Semantic Headers: A Manual for Knowledge Engineers., DIMACS Tech., Rutgers University, Oct. 2000, 50 pages.
Gazdar et al., Natural Language Processing in Prolog: An Introduction to Computational Linguistics, Computational Linguistics, vol. 16, No. 2, Jun. 1990, pp. 116-120.
Grefenstette, Explorations in Automatic Thesaurus Discovery, Kluwer Academic, Boston/London/Dordrecht, Sep. 16, 2014, 316 pages.
Harel et al., Learning Novelty-Aware Ranking of Answers to Complex Questions, WWW'19: The World Wide Web Conference, May 2019, pp. 2799-2805.
Hirst, Semantic Interpretation and Ambiguity, Artificial Intelligence, vol. 34, No. 2, Mar. 1988, pp. 131-177.
Jia et al., Adversarial Examples for Evaluating Reading Comprehension Systems, Empirical Methods in Natural Language Processing, Jul. 23, 2017, 11 pages.
Kate et al., Learning to Transform Natural to Formal Languages, Proceedings of the National Conference on Artificial Intelligence, Jul. 2005, pp. 1062-1068.
Katzouris et al., Incremental Learning of Event Definitions with Inductive Logic Programming, Machine Learning, vol. 100, No. 2-3, Jun. 2015, pp. 555-585.
Kovalerchuk et al., Computing with Words Beyond Quantitative Words: Incongruity Modeling, 2015 Annual Conference of the North American Fuzzy Information Processing Society, Aug. 17-19, 2015, pp. 1-6.
Kratzwald et al., Adaptive Document Retrieval for Deep Question Answering, In Proceedings of the Conference on Empirical Methods in Natural Language Processing (EMNLP), Oct.-Nov. 2018, pp. 576-581.
Maybury, Adaptive Multimedia Information Access Ask Questions, Get Answers, First International Conference on Adaptive Hypertext, 2000, 7 pages.
Min et al., Efficient and Robust Question Answering from Minimal Context Over Documents, Proceedings of the 56th Annual Meeting of the Association for Computational Linguistics, Jul. 15-20, 2018, pp. 1725-1735.
Min et al., Multi-Hop Reading Comprehension Through Question Decomposition and Rescoring, Association for Computational Linguistics, Jun. 30, 2019, 13 pages.
Mitra et al., Addressing a Question Answering Challenge by Combining Statistical Methods with Inductive Rule Learning and Reasoning, Association for the Advancement of Artificial Intelligence, Feb. 12, 2016, 7 pages.
Moldovan et al., Performance Issues and Error Analysis in an Open-Domain Question Answering System, 40th Annual Meeting of the Association for Computational Linguistics, Jul. 2002, pp. 33-40.
Muggleton, Inductive Logic Programming, New Generation Computing, vol. 8, 1991, pp. 295-318.
Ng et al., Question Answering Using a Large Text Database: A Machine Learning Approach, Proceedings of the 2001 Conference on Empirical Methods in Natural Language Processing, 2001, 7 pages.
Pasca, Open-Domain Question Answering from Large Text Collections, Journal of Logic, Language and Information, vol. 13, No. 3, 2004, pp. 373-376.
Pfenning, Unification and Anti-Unification in the Calculus of Constructions, Sixth Annual Institute of Electrical and Electronics Engineers Symposium on Logic in Computer Science, Jul. 15, 1991, 12 pages.
Qi et al., Answering Complex Open-domain Questions Through Iterative Query Generation, Proceedings of the 2019 Conference on Empirical Methods in Natural Language Processing and the 9th International Joint Conference on Natural Language Processing, 2019, pp. 2590-2602.
Ray, Nonmonotonic Abductive Inductive Learning, Journal of Applied Logic, vol. 7, Issue 3, Sep. 2009, pp. 329-340.
Rus, High Precision Logic Form Transformation, International Journal on Artificial Intelligence Tools, vol. 11, No. 3, Oct. 2001, 8 pages.
Sidorov et al., Syntactic Dependency-Based N-Grams as Classification Features, Proceedings of the 11th Mexican international conference on Advances in Computational Intelligence, Oct. 2012, 11 pages.
Silva et al., Building a Knowledge Graph from Natural Language Definitions for Interpretable Text Entailment Recognition, Available Online At: https://www.researchgate.net/publication/321771158_Building_a_Knowledge_Graph_from_Natural_Language_Definitions_for_Text_Entailment_Recognition/link/5ea493bb299bf112560e6f7a/download, Jun. 20, 2018, 5 pages.
Vo et al., A Multi-Layer System for Semantic Textual Similarity, 8th International Conference on Knowledge Discovery and Information, vol. 1, Nov. 2016, 12 pages.

(56) References Cited

OTHER PUBLICATIONS

Zettlemoyer et al., Learning to Map Sentences to Logical Form: Structured Classification with Probabilistic Categorial Grammars, Available Online at: https://arxiv.org/ftp/arxiv/papers/1207/1207.1420.pdf, Jul. 2012, 9 pages.
U.S. Appl. No. 17/016,223, Non-Final Office Action mailed on Aug. 17, 2022, 18 pages.
U.S. Appl. No. 17/099,212, Non-Final Office Action mailed on Sep. 19, 2022, 12 pages.
U.S. Appl. No. 16/983,993, Notice of Allowance mailed on Mar. 18, 2022, 19 pages.
U.S. Appl. No. 17/016,223, Final Office Action mailed on Mar. 9, 2023, 23 pages.
U.S. Appl. No. 17/099,212, Notice of Allowance mailed on Dec. 27, 2022, 5 pages.
U.S. Appl. No. 17/016,223, Notice of Allowance mailed on Aug. 7, 2023, 10 pages.
U.S. Appl. No. 17/016,223, Corrected Notice of Allowability mailed on Oct. 4, 2023, 7 pages.

\* cited by examiner

```
auction(restricted_access,_):-restrictedAuction
product(adult,_):-restrictedAuction
seller(credit_card(verification,_),_):-restrictedAuction
credit_card(verification,_)):-restrictedAuction
sell(credit_card(reject(_,_),_),_):-restrictedAuction
bidder(credit_card(_,_),_):-restrictedAuction
seller(credit_card(_,_),_):-restrictedAuction
what_is(auction(restricted_access,_)_):-restrictedAuction
```

SUMMARIZED LOGICAL FORMS BASED ON ABSTRACT MEANING REPRESENTATION AND DISCOURSE TREES

CROSS-REFERENCE TO RELATED APPLICATIONS

This non-provisional application claims priority to U.S. Patent Application No. 62/950,742, filed on Dec. 19, 2019, the disclosure of which is herein incorporated by reference in its entirety for all purposes.

TECHNICAL FIELD

This disclosure is generally concerned with linguistics. More specifically, this disclosure relates to using providing automated answers to questions using summarized logical forms derived through a number of techniques.

BACKGROUND

Linguistics is the scientific study of language. One aspect of linguistics is the application of computer science to human natural languages such as English. Due to the greatly increased speed of processors and capacity of memory, computer applications of linguistics are on the rise. For example, computer-enabled analysis of language discourse facilitates numerous applications such as automated agents that can answer questions from users. The use of "chatbots" and agents to answer questions, facilitate discussion, manage dialogues, and provide social promotion is increasingly popular. To address this need, a broad range of technologies including compositional semantics has been developed. Such technologies can support automated agents in the case of simple, short queries and replies.

BRIEF SUMMARY

Aspects of the present disclosure relate to generating automated answers to questions utilizing summarized logical forms. In at least one embodiment, a method is disclosed for generating an automated answer to a question. The method may comprise generating at least one summarized logical form for text of an answer of a plurality of answers. In some embodiments, the at least one summarized logical form expressing a corresponding main topic of the text in logical form. The method may further comprise indexing the text of the answer utilizing the at least one summarized logical form. The method may further comprise receiving a natural language query comprising the question. The method may further comprise generating a representation of the natural language query based at least in part on converting the natural language query to logical form. In some embodiments, the representation of the natural language query comprising at least one predicate and a plurality of variables that express the natural language query in first-order logic. The method may further comprise matching the representation of the natural language query to a summarized logical form with which the text of the answer is indexed. In some embodiments, the summarized logical form expressing a main topic of the text of the answer. The method may further comprise providing the text of the answer in response to the question based at least in part on matching the representation of the natural language query to the summarized logical form.

In at least one embodiment, a computing device is disclosed. The computing device may comprise a computer-readable medium storing non-transitory computer-executable program instructions and a processing device communicatively coupled to the computer-readable medium for executing the non-transitory computer-executable program instructions. In some embodiments, executing the non-transitory computer-executable program instructions with the processing device causes the computing device to perform the method disclosed above.

In at least one embodiment, a non-transitory computer-readable storage medium storing computer-executable program instructions for generating an automated answer to a question is disclosed. In some embodiments, executing the program instructions by the processing device causes the processing device to perform the method disclosed above.

BRIEF DESCRIPTION OF THE DRAWINGS

FIG. 7 depicts an example discourse tree from which one or more summarized logical forms can be derived, in accordance with at least one embodiment.

DETAILED DESCRIPTION

Figure 1:
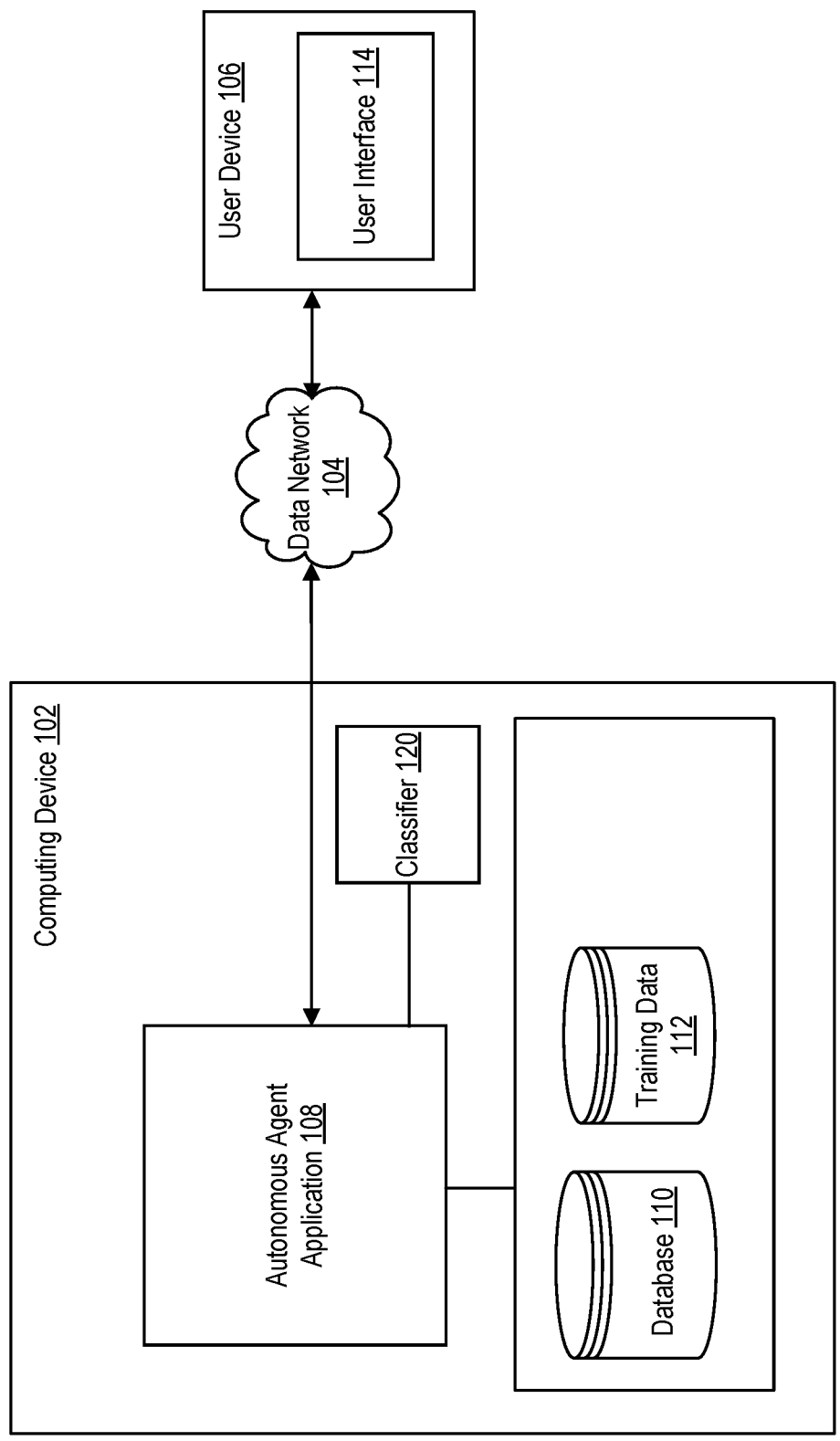
FIG. 1 depicts an autonomous agent environment, in accordance with at least one embodiment.

Aspects of the present disclosure relate to generating automated answers to questions utilizing summarized logical forms. As used herein, a "summarized logical form" (SLF) represents the main topic and a part of an answer and are designed to be matched with questions. In some embodiments, a summarized logical form is a formal syntactically-generalized representation of one or more potential questions obtained from an answer. An SLF may contain the essential information of answers and serve to separate them and may be matched with formal representations of questions as described herein.

Much online content is available via question-answer pairs such as frequently-asked questions stored on customer portals or internal company portals. Question-answer pairs can be an efficient manner to familiarize a user with content. In some cases, autonomous agents (chatbots) can import such question-answer pairs in order to field user questions.

But such question-answer pairs can contain content that is not central to a topic of an answer. For example, content can include text that is irrelevant or misleading, non-responsive to the particular question, or is neutral and not helpful. If irrelevant text is indexed by a keyword-based search engine, the precision of the search engine is lowered. Moreover, an autonomous agent attempting to answer a question based on erroneously-indexed text may answer the question incorrectly, resulting in lowered user confidence in the agent. The techniques disclosed herein improve conventional question answering (Q/A) systems based on generating one or more summarized logical forms identifying informative parts in an answer text and indexing the answer with the summarized logical form(s).

By way of example, one or more summarized logical forms (SLFs) may be generated automatically using semantic and discourse parsers, as well as syntactic and semantic generalization. In some embodiments, an SLF may be generated from abstract meaning representations (AMRs) of sentences by selecting the subgraphs identified as being the most informative. An "abstract meaning representation" (AMR) refers to a directed acyclic graph (DAG) that includes nodes and edges that specify a semantic representation of a portion of text (e.g., the answer being indexed). Additionally, or alternatively, discourse analysis of answer paragraphs may be used to highlight more informative elementary discourse units (EDUs) to convert to SLFs and less informative EDUs which are not converted into SLFs. Discourse analysis utilized a discourse tree which includes nodes and edges that specify a rhetorical relationship between EDUs and/or clauses of the text. Additionally, or alternatively, one or more generalizations of the answer may be utilized to generate an SLF. Generalization (e.g., pair-wise generalization, lattice generalization, etc.) takes two or more text fragments of the answer and generalizes their syntactic, semantic, or discourse-level representations and produces a partially ordered set of generalization results. By way of example, in pair-wise generalization, two examples are compared to identify a common portion and the common portion may be generalized.

In search engineering, selecting keywords or parts of the answer to be indexed and included into a search index is an issue of upmost importance. Conventionally, where the whole documents are indexed, search precision is frequently low because the words which are not indicative of the content of an answer can be matched with the query. If too few words from a document are indexed, search recall is low since for many queries this document will not be triggered as an answer. The techniques disclosed herein provide improvements over conventional Q/A systems by ensuring that the answer is indexed with data indicating the most informative part of the answer rather than indexing the whole of the answer. By utilizing the most informative portions of the answer, the likelihood of providing a relevant answer to the posed question is increased.

FIG. 1 depicts autonomous agent environment 100, in accordance with at least one embodiment.

FIG. 1 depicts computing device 102, data network 104, and user device 106. The computing device 102 may further include database 110 and training data 112. User device 106 may include user interface 114. Training data 112 may be utilized to train classifier 120 to identify answers from corresponding queries (e.g., natural language queries also referred to as "questions") provided at user interface 114.

User device 106 can be any mobile device such as a mobile phone, smart phone, tablet, laptop, smart watch, and the like. User device 106 communicates via data network 104 to computing device 102. Data network 104 can be any public or private network, wired or wireless network, Wide Area Network, Local Area Network, or the Internet.

The classifier 120 may be previously trained by the computing device 102 and/or any suitable system to identify output data from input data. The classifier 120 may include one or more predictive models, classification models, neural networks, and so on. In some embodiments, classifier 120 may be trained utilizing any suitable supervised learning algorithm in which a function (sometimes referred to as "a model") is trained to identify output (e.g., an answer) from provided input (e.g., a natural language query) based at least in part on a training data set including input/output pairs (e.g., other input data previously paired with corresponding output decisions). The classifier 120 can be utilized in any suitable context to provide any suitable decision from input data. In some embodiments, the autonomous agent application 108 may be configured to train the classifier 120 from training data 112 (e.g., a number of example question (input) and answer (output) pairs), or the autonomous agent application 108 may obtain the (already trained) classifier 120 from memory or another system. In some embodiments, the output (e.g., an answer) provided by the classifier 120 may include a decision log which includes the specific factors (e.g., specific user data) which influenced the decision of which answer to provide. In some embodiments, the output may be stored in database 110 and/or the input utilized by the classifier 120 and the corresponding output provided by the classifier 120 may be stored as additional training data within training data 112.

In an example, the database 110 may include a set of answers. Each answer may be associated with one or more summarized logical forms (SLFs) that have been previously generated by the computing device 102 or another system. By way of example, each answer may be associated with at least one of: 1) a summarized logical form (SLF) generated using an abstract meaning representation (AMR) of the answer, 2) an SLF generated using discourse analysis of the answer, and/or 3) an SLF generated using terms identified through pair-wise generalization of the answer. In some embodiments, the one or more SLFs may be generated prior to receiving the natural language query from user device 106. By way of example, the one or more SLFs may be generated in an offline process. Once generated, the SLF(s) may be associated with the answer (e.g., the answer may be indexed with the SLF(s)). A subsequent natural language query may be received. A representation of the query may be generated by converting the query to first order logic (e.g., including at least one predicate and a number of variables that express the natural language query). The representation of the query can be compared with the SLF(s) of the answers of database 110. If a match is found between the representation of the query and one or more SLFs of an answer, that answer may be provided in response to the query. In some embodiments, if multiple matches are found, the answers may be scored according to any suitable scoring algorithm and a particular answer may be selected from the candidate answers and provided in response to the query based at least in part on the score.

Figure 2:
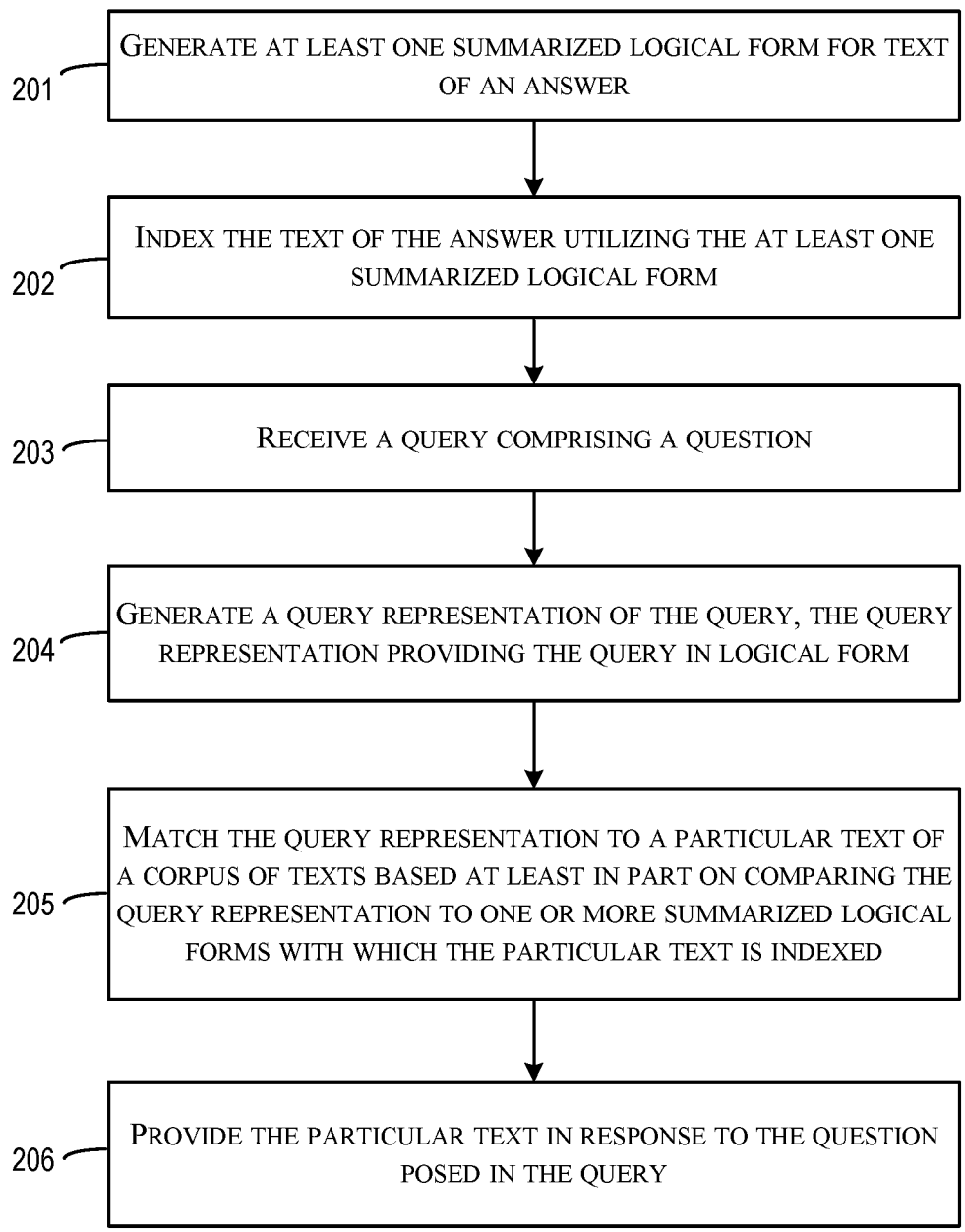
FIG. 2 depicts a flowchart illustrating an example method for generating an automated answer to a question, in accordance with at least one embodiment.

FIG. 2 depicts a flowchart illustrating an example of a method 200 for generating an automated answer to a question, in accordance with at least one embodiment. In some embodiments, the method 200 may be performed by the autonomous agent application 108 of FIG. 1.

The method 200 may begin at 201, where at least one summarized logical form is generated for text of an answer (e.g., an answer of a plurality of answers). In some embodiments, the at least one summarized logical form expresses a corresponding main topic of the text in logical form. Multiple techniques for generating a summarized logical form are discussed in more detail with respect to FIGS. 3-6.

At 202, the text of the answer may be indexed utilizing the at least one summarized logical form. By way of example, the text of the answer (or the answer itself) may be associated with any suitable number of SLFs which express one or more main topics of the text in logical form.

At 203, a natural language query comprising a question may be received. As used herein, a natural language query includes only normal terms of a user's language without any special syntax or formal.

At 204, a representation of the natural language query may be generated based at least in part on converting the natural language query to logical form. Logical form of a syntactic expression is a precisely-specified semantic version of that expression in a formal system. A logical form attempts to formalize a possibly ambiguous statement into a statement with a precise, unambiguous logical interpretations with respect to a formal system. In some embodiments, the representation of the natural language query comprising at least one predicate and a plurality of variables that express the natural language query in first-order logic. First-order logic—also known as predicate logic and first-order predicate calculus—is used in mathematics, philosophy, linguistics, and computer science. First-order logic uses quantified variables over non-logical objects and allows the use of sentences that contain variables, so that rather than propositions such as "Socrates is a man," one can have expressions in the form "there exists x such that x is Socrates and x is a man" where "there exists" is a quantifier and x is a variable.

Programs are written in the language of some logic. Execution of a logic program is a theorem proving. Answering a question is formulated as a search of inference for a logical representation of this question, where available answers are associated with some axioms (expressing meanings of these answers). The axioms which are employed to infer the question are associated with correct answers for this question. Hence a set of answers along with their logical representations is a logic program.

An execution of a logic program is a theorem proving process; that is, computation is done by logic process. A logic program is a collection of clauses of the form A|–$B_1$, $B_2$, . . . , $B_n$ where A and $B_i$'s are atoms. '|–' replaces the logic implication. For example, given information about who is a mother/father of whom, one can define a grandmother/father relationship. Answers are in format 'text: LF'.

A1: Joe is father of Mary: father(joe, mary)

A2: Kathy is mother of Mary: mother(kathy, mary)

A3: Mary is mother of Bill: mother(mary, bill)

A4: Ken is father of Karen: father(ken, karen)

Q: Who are grandparents of Joe?

In this simple case, LFs are atoms. Capital letters denote variables, quantified by $\forall$ (for any). A predicate's variables (arguments) can be instantiated (have values) or uninstantiated (remain a variable). For example, the first argument is uninstantiated and the second is instantiated in father (F, karen).

The meaning of the predicated involved in answers may be defined: grandparent(Y,Z) :-parent(Y,Z parent(Y,Z). parent(X, Y) :-father(X, Y); mother(X, Y). With these definitions as a logic program for answers, one or more additional questions can be formulated such as:

Q: ?-grandparent(joe, bill)—'is Joe a grandparent of Bill?'. A: Yes

Q: ?-grandparent(Q, karen)—'Who is a grandparent of Karen?', A: No

Q:-?-grandparent(Q, bill)—'Who is a grandparent of Bill?', A: Q=joe; Q=kathy.

Above are regular predicates whose variables range over objects like people. Metapredicates are predicates whose variables range over atoms and clauses. In some embodiments, a predefined set of rules may be utilized to convert the natural language query to its corresponding logical form.

At 205, the representation of the natural language query may be matched to a summarized logical form (e.g., one of the SLFs) with which the text of the answer is indexed. In some embodiments, more specific SLFs (e.g., SLFs generated from AMR) may be matched with a query representation first, followed by less specific SLFs (e.g., SLFs generated with discourse analysis and/or lattice generalization) until the match is successful. For example, three differing techniques may have previously been used to generate SLFs. The first technique uses AMR and is based on semantic analysis that attempts to select the most "informative" parts of semantic representation. The second technique is based on discourse analysis and identifying preferred text fragments (e.g., nucleus elementary discourse units (EDUs)) in a discourse tree (DT) of an answer. The third technique takes two or more text fragments and generalizes their syntactic, semantic, or discourse-level representations and produces a partially ordered set of generalization results.

At 206, the text of the answer may be provided in response to the question based at least in part on matching the representation of the natural language query to the summarized logical form.

Figure 3:
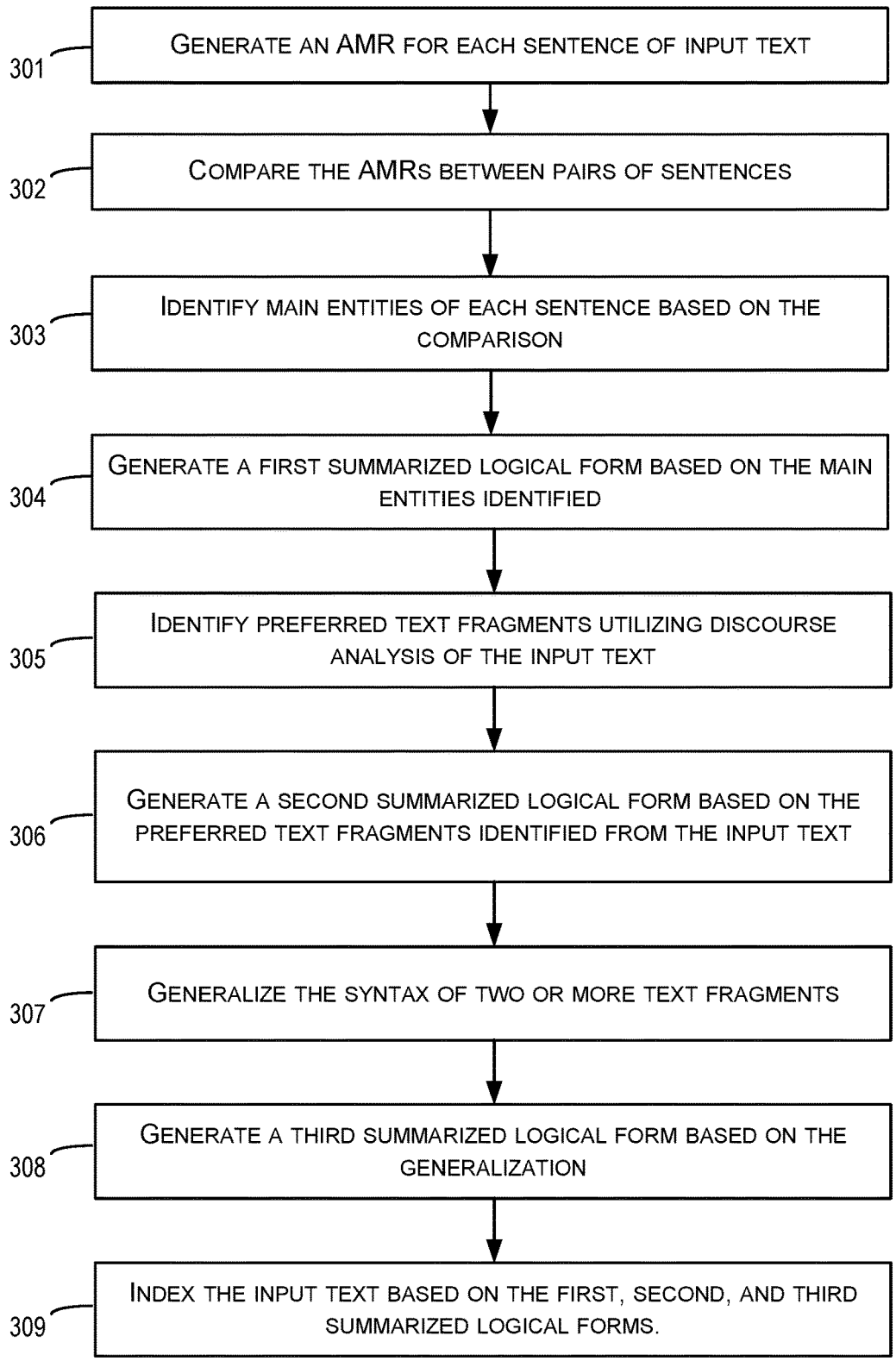
FIG. 3 depicts a flowchart illustrating an example method for indexing text using a number of summarized logical forms, in accordance with at least one embodiment.

FIG. 3 depicts a flowchart illustrating an example method 300 for indexing text using a number of summarized logical forms, in accordance with at least one embodiment. The method 300 may be performed by the autonomous agent application 108 of FIG. 1. Three different techniques may be utilized to generate summarized logical forms: abstract meaning representation, discourse analysis, and lattice generalization.

Abstract meaning representation (AMR) aims to abstract away from various syntactic phrasings, so that there are SLFs covering broader meanings. The same AMR may be assigned to differently phrased sentences which each have the same basic meaning. AMR has tree representations formatted as rooted, directed, edge-labeled and leaf-labeled trees. A simple AMR representation for the meaning of "The clerk prepares to leave" is provided in FIG. 4.

The AMR 400 is shown as a graph (e.g., a directed acyclic graph (DAG)). The AMR 400 may also be expressed by the following:

(w/prepare
  :arg0 (b/clerk)
  :arg1 (g/leave
    :arg0 b))

This AMR may be expressed in logical form by the following:

$\exists$w, b, g: instance(w, prepare) $\wedge$instance(g, leave)
  $\wedge$instance(b, clerk) $\wedge$arg0(w, b)
    $\wedge$arg1 (w, g) $\wedge$arg0(g, b)

AMR may rely on a predefined frameset(s) to abstract away from English syntax. For example, a predefined frameset associate-01 may have three pre-defined slots:
:arg0 is the agent doing association,
:arg1 is the thing being associated with, and
:arg2 is an association thing.
(associate-01
  :arg0 (teacher)
  :arg1 (m2/apple)
  :arg2 (d/ball))

AMR may have multiple syntactic relations: 'The manager spoke to the client as she walked in from the street.'
(speak
  :arg0 (manager)
  :beneficiary (client)
  :time (walk
    :arg0 (client)
    :source (street)))

This structure covers various phrasings: 'While the client was walking in from the street, a manager spoke to her. The client walked in, and had the manager spoke to her. As the client walk in, there was a manager speaking to her. She walking in from the street; the manager was speaking to her.'

AMR can include annotations for named entities, coreference, semantic relations, discourse connectives, temporal entities, etc. Each annotation may have its own associated evaluation, and training data may be split across many resources. Since there is a lack of a simple readable semantic bank of English sentences paired with their whole-sentence, logical meanings, a sizable semantic bank may lead to new work in statistical natural language understanding (NLU), resulting in semantic parsers that are as ubiquitous as syntactic ones, and support natural language generation (NLG) by providing a logical semantic input. The motivations for AMR may include the following:

1) AMRs may be represented as rooted, labeled graphs rather than trees that can be subject to traversal;
2) AMRs may attempt to express an abstraction away from syntactic idiosyncrasies. The same AMR may be assigned to sentences that have the identical meaning;
3) An AMR may utilize a particular framework (e.g., a set of predefined framesets such as PropBank framesets);
4) An AMR may be agnostic about how meanings are derived from lexical units, or vice versa. In translating sentences to AMR, a particular sequence of rule applications or provide alignments that reflect such rule sequences may not be utilized. The lack of sequencing makes semantic banking very fast;
5) AMR may be biased towards English.

In some embodiments, AMR(s) may be used to identify informative parts of each answer sentence and build SLFs from them while ignoring less informative (e.g., non-informative) parts. Parts of an answer that may be deemed informative may include definitions, main parts of compound queries, facts, actions over main entities, and/or domain-specific information. The phrases that are deemed non-informative may relate to opinionated expressions, clarifying, explaining, motivating expressions, and/or auxiliary attributes of main entities. Method 300 provides an example for generating an AMR for each sentence of input text.

The method 300 may begin at 301, where an AMR is generated for each sentence of input text (e.g., each sentence of an answer). Each AMR may include a simple tree structure that shows the connections between concepts and events, making them easy to read. Because each AMRs can simply be expressed as directed acyclic graphs, machine-generated output can be evaluated in a standard way by computing precision and recall on triples of gold-standard AMRs. Moreover, AMRs may be easier to produce manually than traditional formal meaning representations.

At 302, the AMRs of pairs of sentences may be compared. By way of example, an input text having three sentences may have three AMRs generated, a first AMR corresponding to the first sentence, a second AMR corresponding to the second sentence, and a third AMR corresponding to the third sentence.

At 303, main entities of each sentence may be identified based on comparing each unique pair of AMRs (e.g., first/second, second/third, third/first).

Figure 5A:
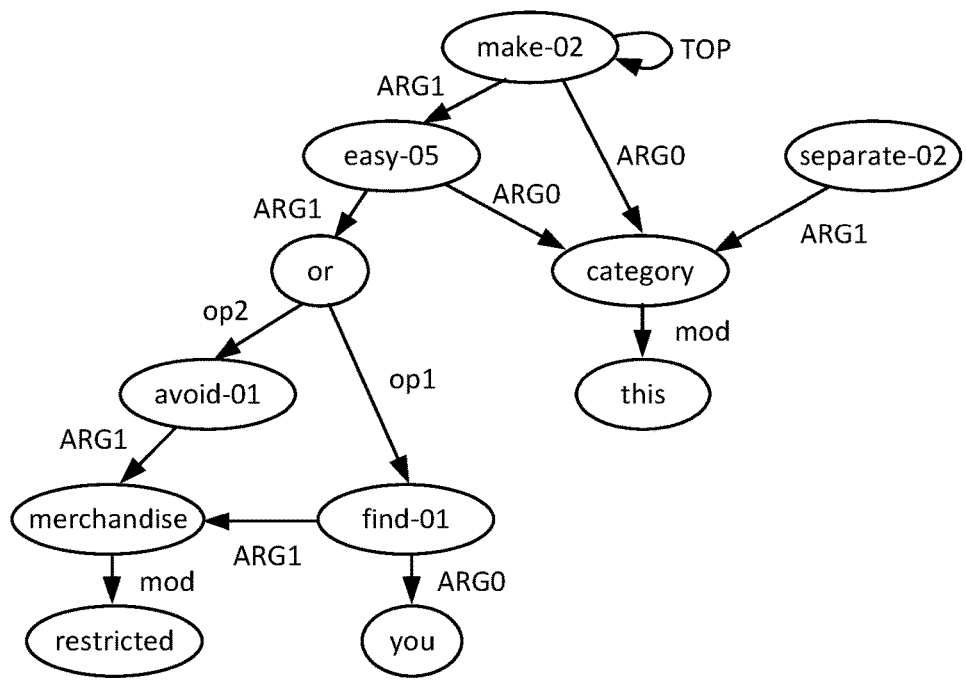
FIGS. 5A and 5B depicts an abstract meaning representations for two portions of an answer, in accordance with at least one embodiment.
Figure 5B:
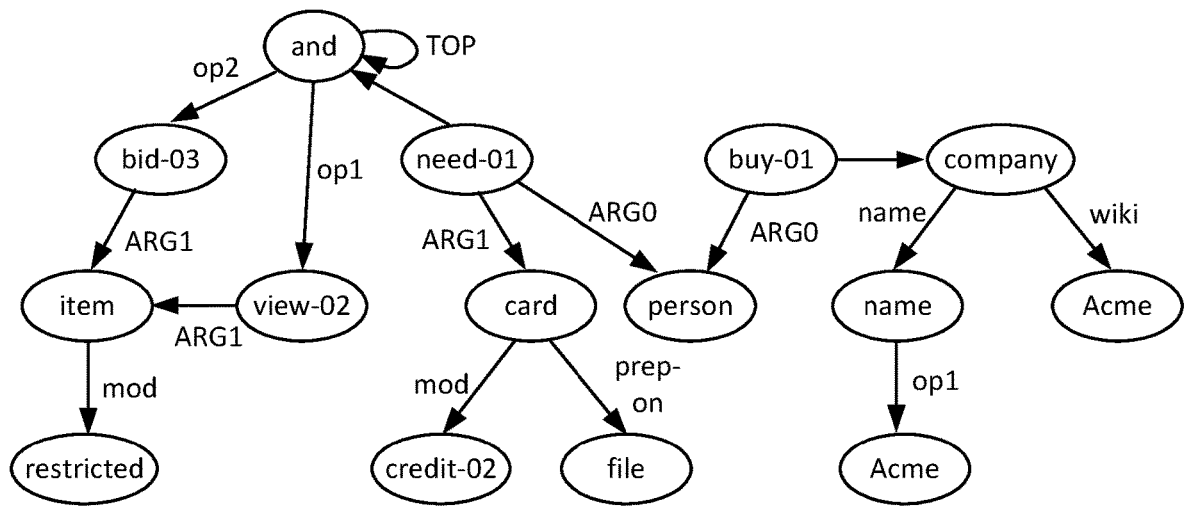

FIGS. 5A and 5B depicts an abstract meaning representations for two portions (e.g., sentences) of an answer, in accordance with at least one embodiment. An example answer may include the text: "Restricted-Access Auctions. This separate category makes it easy for you to find or avoid restricted merchandise. To view and bid on restricted items, buyers need to have a credit card on file with Acme Auction. Your card will not be charged. Sellers must also have credit card verification. Items listed in the restricted category are not included in the New Items page or the Hot Items section, and currently, are not available by any title search." FIG. 5A may depict the AMR for the sentence "This separate category makes it easy for you to find or avoid restricted merchandise." FIG. 5B may depicts the AMR for the sentence "To view and bid on restricted items, buyers need to have a credit card on file with Acme Auction."

In some embodiments, a discourse tree may be built to verify that there is a continuous flow of information (e.g., that all rhetorical relations are Elaborations). If so, then a canonical question may be formed for each chunk of information introduced by each new sentence.

elaboration
  elaboration
    TEXT: Restricted-Access Auctions.
    elaboration
      elaboration
        TEXT: This separate category makes it easy for you to find or avoid restricted merchandise.
        elaboration
        enablement (RightToLeft)
          TEXT: To view and bid on restricted items,
          TEXT: buyers need to have a credit card on file with Acme Auction.
        TEXT: Your card will not be charged.
      TEXT: Sellers must also have credit card verification. same-unit
    TEXT: Items
    joint
      TEXT: listed in the restricted category are not included in the New Items page or the Hot Items section
      TEXT: and currently, are not available by any title search.

For example, to derive a canonical question for the AMRs of FIGS. 5A and 5B a common subgraph must be found which provides '<What-is> restricted [item/merchandise] '. Finding a common subgraph can provide the main_entity for the whole answer that can be added to canonical questions obtained by other means main_entity='restricted [item/merchandise] '.

There are additional techniques for generating SLFs from AMRs. For example, subgraphs that are unique to each sentence may be identified and used to form questions, which in turn can be used to generate an SLF. For example, for the sentence corresponding to FIG. 5A, two questions may be expressed: '<how-to/why/When/where>[avoid/find] <main_entity>' and 'Why/what/reason for separate category for <main_entity] '. For the sentence corresponding to FIG. 5B, two questions may be formed (e.g., '<What you/he/she> need to [bid/view]<main_entity>'
and '<Why/what for you/he/she> need a credit card') based on starting from the root node 'need." Thus, rhetorical relation of enablement can be used to identify canonical questions: one for what is enabled, and another what enables.

In some embodiments, questions (e.g., SLFs) can be generated for each sentence. Another example text is provided below:

"If you do not pay your tax through withholding, or do not pay enough tax that way, you might have to pay estimated tax. People who are in business for themselves generally will have to pay their tax this way. You may have to pay estimated tax if you receive income such as dividends, interest, capital gains, rents, and royalties. Estimated tax is used to pay not only income tax, but other taxes such as self-employment tax and alternative minimum tax.'

Figure 6:
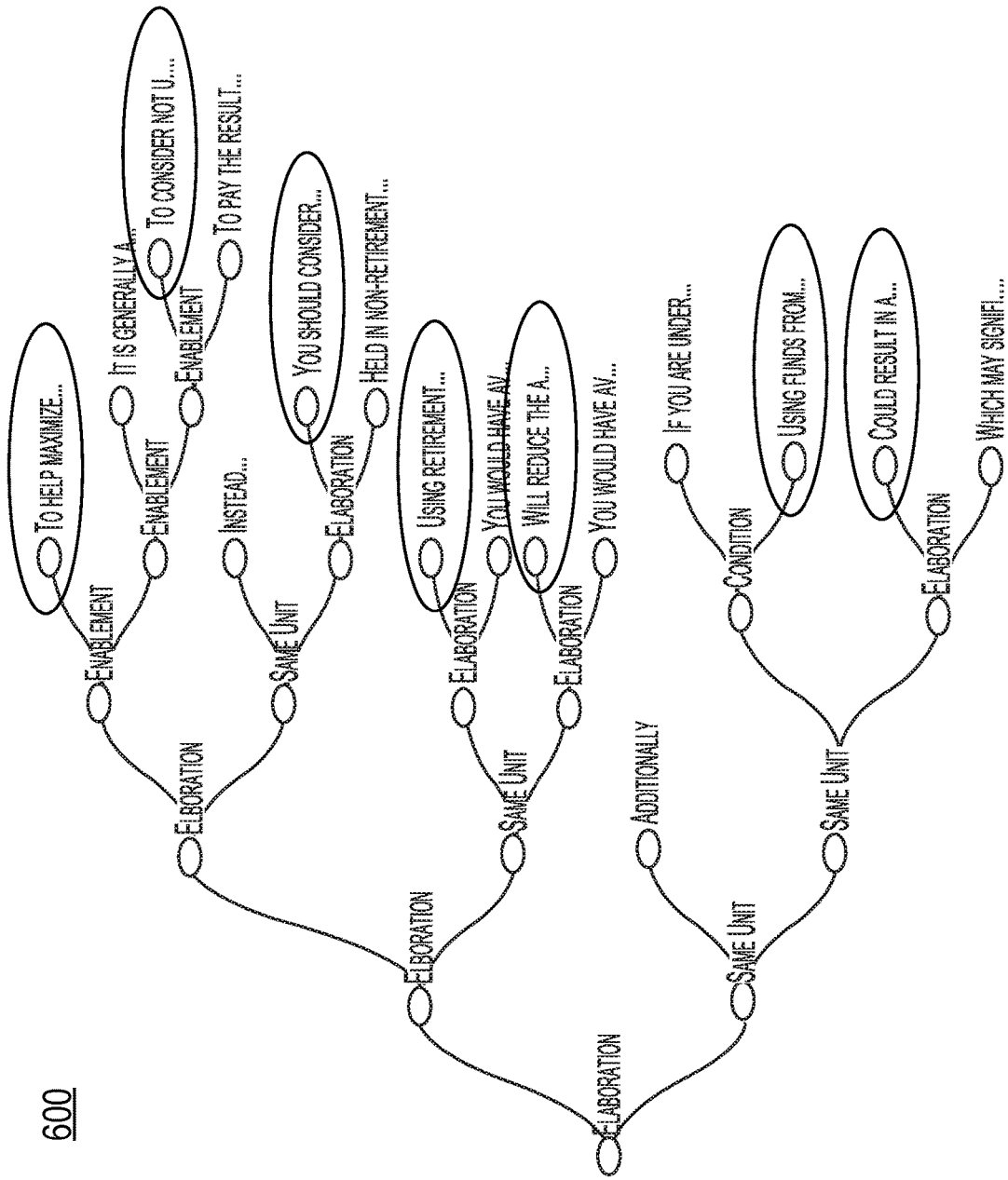
FIG. 6 depicts a set of example summarized logical forms, in accordance with at least one embodiment.

In some embodiments, a number of SLFs may be derived from AMR trees rather than trying to formulate them from the actual text. By way of example, a discourse tree can be generated for the answer and a rhetorical relation of Condition may be identified. A number of canonical questions for SLFs may be built to the second and third sentences (FIG. 6). The main_entity is shown in bold.

'What happens when I do not pay enough tax'
'When will I have to pay estimated tax'

A discourse tree for the answer is shown below with portions from which canonical questions are derived being bolded.
elaboration
  elaboration
    condition (RightToLeft)
      joint
        TEXT: If you do not pay your tax through withholding,
        TEXT: or do not pay enough tax that way,
        TEXT: you might have to pay estimated tax.
      attribution (RightToLeft)
        TEXT: People
        TEXT: who are in business for themselves generally will have to pay their tax this way.
    elaboration (LeftToRight)
      condition (LeftToRight)
        TEXT: You may have to pay estimated tax
        TEXT: if you receive income such as dividends, interest, capital gains, rents, and royalties.
      TEXT: Estimated tax is used to pay not only income tax, but other taxes such as self-employment tax and alternative minimum tax.

Returning to FIG. 3, at 304 a first summarized logical form may be generated based at least in art part on the main entities identified at 303 (e.g., common subgraphs and/or generate canonical questions).

At 305, discourse analysis of the input text may be utilized to identify preferred text fragments (e.g., elementary discourse units (EDUs) that are preferred over other EDUs). An example technique for utilizing discourse analysis is provided with reference to FIG. 6.

FIG. 6 depicts an example discourse tree 600 from which one or more summarized logical forms can be derived, in accordance with at least one embodiment. Discourse trees (DT) originate from Rhetorical Structure Theory (RST).

RST models a logical organization of text, relying on relations between parts of text. RST simulates text coherence (by forming a hierarchical, connected structure of texts via discourse trees. Rhetoric relations are split into the classes of coordinate and subordinate; these relations hold across two or more text spans and therefore implement coherence. These text spans are called elementary discourse units (EDUs). The leaves of a discourse tree correspond to EDUs, the contiguous atomic text spans. Adjacent EDUs are connected by coherence relations (e.g., attribution, sequence), forming higher-level discourse units.

The term "nuclearity" in RST refers to which text segment, fragment, or span, is more central to an author's purpose. A "nucleus" refers to a span of text that is more central to an author's purpose than a "satellite", which is less central to the topic. The EDUs of a discourse tree generated for a body of text (e.g., an answer) and the relations between the EDUs may be used to determine which EDUs should be indexed for search. By way of example, in some embodiments, the EDUs identified as being a nucleus may be utilized for indexing. That is, an SLF may be generated from these nuclei and used to index the answer. Different rhetorical relations (e.g., elaboration, contrast, etc.) can employ different rules. In general, a satellite may express a detail of information that is unlikely to be explicitly queried by a user.

As a non-limiting example, consider the question answer pair:

Q: How should I plan to pay for taxes resulting from converting to a Roth IRA?

A: To help maximize your retirement savings, it's generally a good idea to consider not using the proceeds from the conversion to pay the resulting tax costs. Instead, you should consider using cash or other savings held in nonretirement accounts. Using retirement account funds to pay the taxes will reduce the amount you would have available to potentially grow tax-free in your new Roth IRA. Additionally, if you are under 59½, using funds from your retirement account could result in an additional 10% tax penalty, which may significantly reduce the potential benefit of conversion.

The corresponding discourse tree is depicted in FIG. 6. Some fragments in each answer are more informative to answering the corresponding question than other fragments. For example, the phrase "it is generally a good idea" adds little to the answer, whereas "consider not using the proceeds from the conversion" is informative to the user who posed the original question. Informative text can be identified from a body of text. For example, a predefined set of rules may be utilized to identify an EDU as a nucleus. An example rule set is provided below.

| Relation | Example | SLF selection rule |
|---|---|---|
| Elaboration | To achieve some state [ nucleus ] \| do this and that [satellite] | Nucleus |
| Enablement | A query may be of the form "how to achieve some state?" but less likely be of the form "what can I achieve doing this and that?" | Nucleus |
| Condition | A query may be of the form "howWhen the question is of the to achieve some state?" but less type "when/where/under likely of the form "what can I what condition . . .", select achieve doing this and that?" the if part (the satellite). |  |
| Contrast | Select the nucleus. The satellite includes facts which are unusual, unexpected, unanticipated. | |
| Same-Unit, Joint | Select both nucleus and satellite because of the symmetric relationship of Same-unit. | |

In summary, a set of one or more answers may be obtained and, for each answer, a discourse tree may be generated using an RST-parser. For each non-terminal node in each answer, a rhetorical relationship associated with the non-terminal node may be identified and each terminal node may be labeled as being associated with the non-terminal node as either a nucleus or a satellite. A set of rules associated with the rhetorical relationships may be utilized to select, based on the rules, one or more of the fragments associated with the nucleus or the fragment associated with the satellite.

In some embodiments, machine-learning can be used to learn rules such as those depicted above. By way of example, a machine-learning problem may be formulated as a classification problem that classifies EDUs in a for class that is suitable for indexing (e.g., informative) and a second class that is not suitable for indexing (i.e., not informative). In some embodiments, a machine-learning model (e.g., a formula) may be generated based at least in part on a training data set including discourse trees of text examples for which nuclei and satellites have been previously identified. The model may be generated based at least in part on any suitable supervised learning algorithm (e.g., regression analysis, etc.).

Returning to FIG. 3, at 306, a second summarized logical form may be generated based at least in art part on the preferred text fragments identified from the input text at 305 (and as described in connection with FIG. 6).

At 307, a syntax of two or more text fragments may be generalized. When canonical questions and/or SLFs are built, it may not be known in advance which level or degree of generalization is optimal. If a SLF for a given answer is too general, it can trigger an answer to be used answer questions it should not, so precision would drop. If a canonical question is too specific, recall would deteriorate. To provide an optimal solution, multiple generalization results may be obtained and matched with the query representation in real time, to find the least general generalization. To treat multiple generalizations systematically, a lattice may be utilized to order the generalizations according to how each pair-wise generalization of texts iteratively converges to the default non-informative (empty) generalization. In some embodiments, lattice SLF ($SLF_{lattice}$) includes multiple generalizations of two or more answers. At search time (instead of indexing time), going from least general to more general, it may be determined which generalization of answers to match with the query representation. When a given $SLF_{lattice}$ matches, all texts which yielded this $SLF_{lattice}$ may be returned as an answer. $SLF_{lattice}$ are designed to be applied when all available $SLF_{AMR}$ and $SLF_{DT}$ has failed to match the query representation.

In lattice generalization, a user formulates a query to explore a dataset. Instead of the query, he provides a few samples (expressions of interest) so that the system formulates a query as an overlap (generalization) of these samples, applied in the form of a lattice (whose nodes are shown in bold on the bottom). In some embodiments, lattice queries may be utilized, based on natural language expressions that are generalized into an actual query. A lattice query includes words as well as attributes such as entity types and verb attributes. Forming lattice queries is based on generalization.

In some embodiments, sentence-based lattice generalization can be employed. For example, in an employee search example; imagine a company looking for the following individuals:

A junior sale engineer expert travels to customers on site;
A junior design expert goes to customer companies;
A junior software engineer rushes to customer sites.

Given the above set of samples, a job-search query may be formed that would provide candidates somewhat similar to what is being sought. A trivial approach would be to just turn each sample into a query and attempt to find an exact match. However most of times it would not work, so such queries need to release some constraints. One might need to determine which constraints need to be dropped and which keywords are to be utilized.

To do that, generalization may be applied to the set of these samples. For the entities and attributes, the least general generalization may be formed. The seniority of the job (adjective) 'junior' will stay. The job activity (noun phrase) varies, so it can be generalized into <job-activity>. The higher-level reference to the job is 'expert' and is common for all three cases, so it stays. The verbs for job responsibility vary, so we use <action> that can be further specified as <moving_action>, using verb-focused ontologies like VerbNet. The last noun phrase can be generalized to <customer, NP>: junior <any job activity> expert <action> customer-NP.

This is a lattice query, which is expected to be run against job descriptions index and find the cases which are supposed to be most desired, according to the set of samples. In terms of parse trees of the potential sentences to be matched with the lattice query, we rewrite it as: JJ junior NP-*NN-expert VP-*NN-customer NP-*. The lattice query reads as find me a junior something expert doing-something-with customer of-something.

The lattice query can be represented as a conjunction of noun phrases (NP) and verb phrases (VP) set: [[NP [DT-a JJ-junior NN-*NN-*], NP [NN*-customers]], [VP [VB-*TO-to NN*-customers]]]. The first NP covers the beginning of the lattice query above, and the second NP covers the end. VP covers the second half of the lattice query starting from doing-something. The generalization between the lattice query and a candidate answer is: [[NP [JJ-junior NN-*NN-*], NP [NN*-customers]], [VP [VB-*TO-to NN*-customers]]].

Three phrase representations for the three statements are as follows:

[[<1>NP'A':DT, <2>NP'junior':JJ, <3>NP'sale':NN, <4>NP'engineer':NN, <5>NP'expert':NN], [<6>VP-'travels':VBZ, <7>VP'to':TO, <8>VP'customers': NNS, <9>VP'on':IN, <10>VP'site':NN], [<7>PP'to': TO, <8>PP'customers':NNS, <9>P'on':IN, <10>PP'site':NN], [<8>NP'customers':NNS, <9>NP'on' IN, <10>NP'site':NN], [<8>NP'customers':NNS, [<9>PP'on':IN, <10>PP'site':NN], [<10>NP'site':N]]

[[<1>NP'A':DT, <2>NP'junior':JJ, <3>NP'design':NN, <4>NP'expert':NN], [<5>VP'goes':VBZ, <6>VP'to': TO, <7>VP'customer':NN, <8>VP'companies':NNS], [<6>PP'to':TO, <7>PP'customer':NN, <8>PP'companies':NNS], [<7>NP'customer':NN, <8>NP'companies':NNS]]

[[<1>NP'A':DT, <2>NP'junior':JJ, <3>NP'software': NN, <4>NP'engineer':NN], [<5>VP'rushes':VBZ, <6>VP'to':TO, <7>VP'customer':NN, <8>VP'sites': NNS], [<6>PP'to':TO, <7>PP'customer':NN, <8>PP'sites':NNS], [<7>NP'customer':NN, <8>NP'sites':NNS]]

Generalizing these three expressions provides the query: [[NP [DT-a JJ-junior NN-*NN-*], NP [NN*-customers]], [VP [VB-*TO-to NN*-customers]]]. A lattice query Q is satisfied by a sentence S, if Q^S=S. In practice a weak satisfaction is acceptable, where Q^S∈S, but there are constraints on the parts of the lattice query: 1) a number of parts in Q^S should be the same as in Q and 2) all words (not POS-*placeholders) from Q should also be in Q^S.

Text samples to form a lattice query can be typed, but also can be taken from an existing text (e.g., an answer). Let us consider an example of a safety-related exploration task, where a researcher attempts to find a potential reason for an accident. Previously provided incident descriptions can be generalized into a lattice query to be run against a corpus of texts for the purpose of finding a root cause of a situation being described. Two such descriptions are provided below.
Description 1: Crossing the snow slope was dangerous. They informed in the blog that an ice axe should be used. However, I am reporting that crossing the snow field in the late afternoon I had to use crampons.
Description 2: I could not cross the snow creek since it was dangerous. This was because the previous hiker reported that ice axe should be used in late afternoon. To inform the fellow hikers, I had to use crampons going across the show field in the late afternoon.

As a result of generalization from two above cases, a set of expressions may be obtained for various ways of formulating commonalities between these cases. The following snapshot of a corpus of text may be used to illustrate how a lattice query is matched with a paragraph: I had to use crampons to cross snow slopes without an ice axe in late afternoon this spring. However, in summer I do not feel it was dangerous crossing the snow.

The two phrases of the different sentences may be linked as depicted below since they are connected by a rhetoric relation based on "however."
 rel: <sent=1-word=1..inform>===><sent=2-word=4..report>
 From [<1>NP'They':PRP]
 TO [<4>NP'am':VBP, NP'reporting':VBG, <8>NP'the': DT, <9>NP'snow':NN, <10>NP'field':NN, <11>NP'in':IN, <12>NP'the':DT, <13>NP'late':JJ, <14>NP'afternoon':NN, <15>NP'I':PRP, <16>NP'had':VBD, <17>NP'to':TO, <18>NP'use': VB, <19>NP'crampons':NNS]
Phrases of different sentences may be linked based on communicative actions such that
 rel: <sent=1-word=6..report>><sent=2-word=1..inform>
 From [<4>NP'the':DT, <5>NP'previous':JJ, <6>NP'hiker':NN]
 TO [<1>NP'To':TO, <2>NP'inform':VB, <3>NP'the': DT, <4>NP'fellow':JJ, <5>NP'hikers':NNS]
Thus, as a result of generalizing two paragraphs, the following lattice query may be obtained:
 [[NP [NN-ice NN-axe], NP [DT-the NN-snow NN-*], NP [PRP-i], NP [NNS-crampons], NP [DT-the TO-to VB-*], NP [VB-*DT-the NN-*NN-field IN-in DT-the JJ-late NN-afternoon (TIME)]], [VP [VB-was JJ-dangerous], VP [VB-*IN-*DT-the NN-*VB-*], VP [VB-*IN-*DT-the IN-that NN-ice NN-axe MD-should VB-be VB-used], VP [VB-*NN-*VB-use], VP [DT-the IN-in], VP [VB-reporting IN-in JJ-late NN-afternoon (TIME)], VP [VB-*NN*-*NN-*NN*-*], VP [VB-crossing DT-the NN-snow NN-*IN-*], VP [DT-the NN-*NN-field IN-in DT-the JJ-late NN-afternoon (TIME)], VP [VB-had TO-to VB-use NNS-crampons]]]

Based on the lattice generalization above, potential safety-related 'issues' include ice-axe, snow, crampons, being at a . . . field during later afternoon, being dangerous, necessity to use ice-axe, crossing the snow, and others. Because these issues occur in both samples, they are of a potential interest.

Given an answer text, the sentences and/or paragraphs of the answer may be generalized to form a lattice generalization.

Returning to FIG. 3, at 308, a third summarized logical form may be generated based at least in art part on the generalizations identified at 307.

At 309, the input text (e.g., the answer) may be indexed with the first, second, and third summarized logical forms.

FIG. 7 depicts a set of example summarized logical forms, in accordance with at least one embodiment. The set of example summarized logical forms can include any suitable number of SLFs generated using 1) AMRs to identify main entities of each sentence of an answer, 2) discourse analysis to identify preferred text fragments, and/or 3) generalizations of the sentences and/or paragraphs of the answer.

Figure 8:
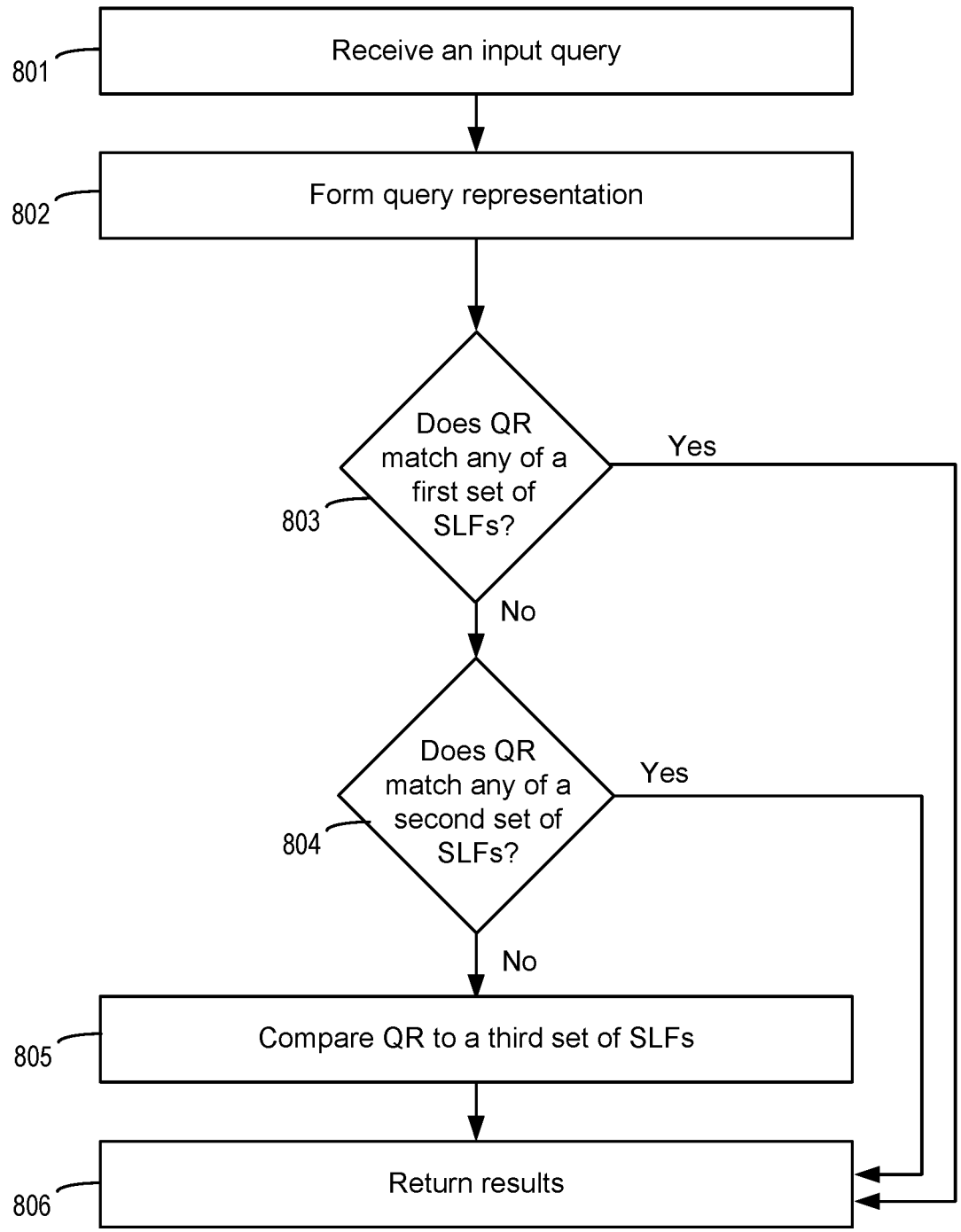
FIG. 8 depicts a block diagram illustrating an example method for matching a query representation to a summarized logical form, in accordance with at least one embodiment.

FIG. 8 depicts a block diagram illustrating an example method 800 for matching a query representation to a summarized logical form, in accordance with at least one embodiment. The method 800 may include an iterative procedure for matching SLFs obtained by different methods (e.g., AMRs, discourse analysis, generalizations) with a query representation. The method 800 may be performed after a process for associating a set of answers with one or more corresponding SLFs using the techniques discussed in connection with FIGS. 3-6 has been performed.

The method 800 may begin at 801, where an input query (e.g., a natural language query) may be received.

At 802, a query representation may be formed for the input query. To form a query representation, the input query may be converted to logical form. In some embodiments, the representation of the input query comprising at least one predicate and a plurality of variables that express the natural language query in first-order logic. In some embodiments, a predefined set of rules may be utilized to convert the input query into its corresponding logical form. In some embodiments, a machine-learning model may be utilized to identify a logical form of an input query. The machine-learning model (e.g., a formula) may be trained using a training set including example input queries for which a logical form representation is known. A supervised learning algorithm may be executed with the training set to generate the machine-learning model such that it may be subsequently used to identify logical form representations for new input queries.

Figure 4:
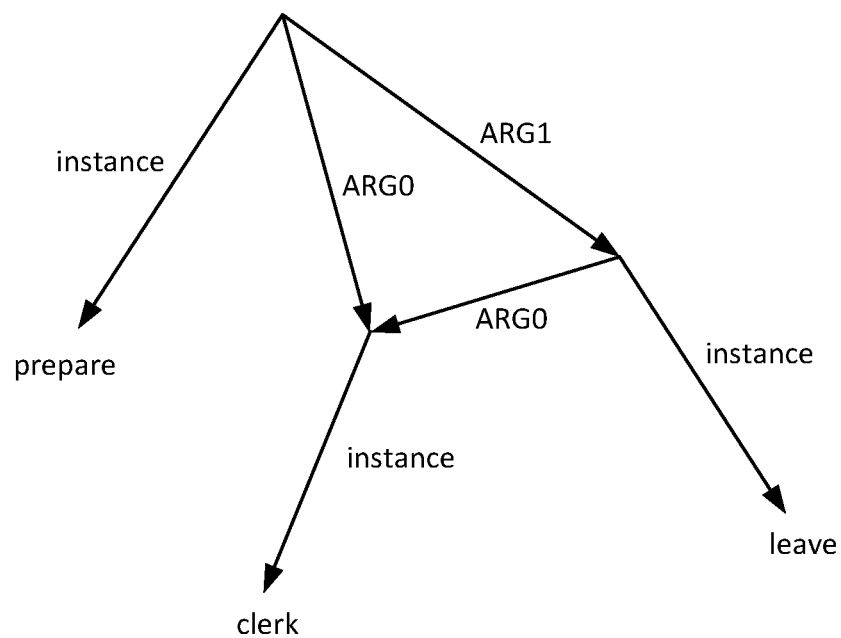
FIG. 4 depicts a directed acyclic graph corresponding to particular text, in accordance with at least one embodiment.

At 803, a determination may be made as to whether the query representation matches any of a first set of SLFs (e.g., SLFs generated using AMRs of the sentences of the answer as described in connection with FIGS. 3 and 4). If one or more matches are made, the method 800 may proceed to 806 where one or more of the answers are returned. It should be appreciated that in some embodiments, if more than one answer is found for the question based on the answers' corresponding SLFs, the answers may be scored and a single answer may be returned at 806 based at least in part on the score. If no matches are found, the method 800 may proceed to 804.

At 804, a determination may be made as to whether the query representation matches any of a second set of SLFs (e.g., SLFs generated using discourse analysis as described above in connection with FIG. 6). If one or more matches are made, the method 800 may proceed to 806 where one or more of the answers are returned. It should be appreciated that in some embodiments, if more than one answer is found for the question based on the answers' corresponding SLFs, the answers may be scored and a single answer may be returned at 806 based at least in part on the score. If no matches are found, the method 800 may proceed to 805.

At 804, the query representation may be compared to a third set of SLFs (e.g., SLFs generated from one or more generalizations of the answer. If one or more matches based on the comparison, the method 800 may proceed to 806 where the one or more matched answers are returned. It should be appreciated that in some embodiments, if more than one answer is found for the question based on the answers' corresponding SLFs, the answers may be scored and a single answer may be returned at 806 based at least in part on the score. If no matches are found, the method 800 may proceed to 806 where an indication may be provided indicating that no answer was found for the question.

Figure 9:
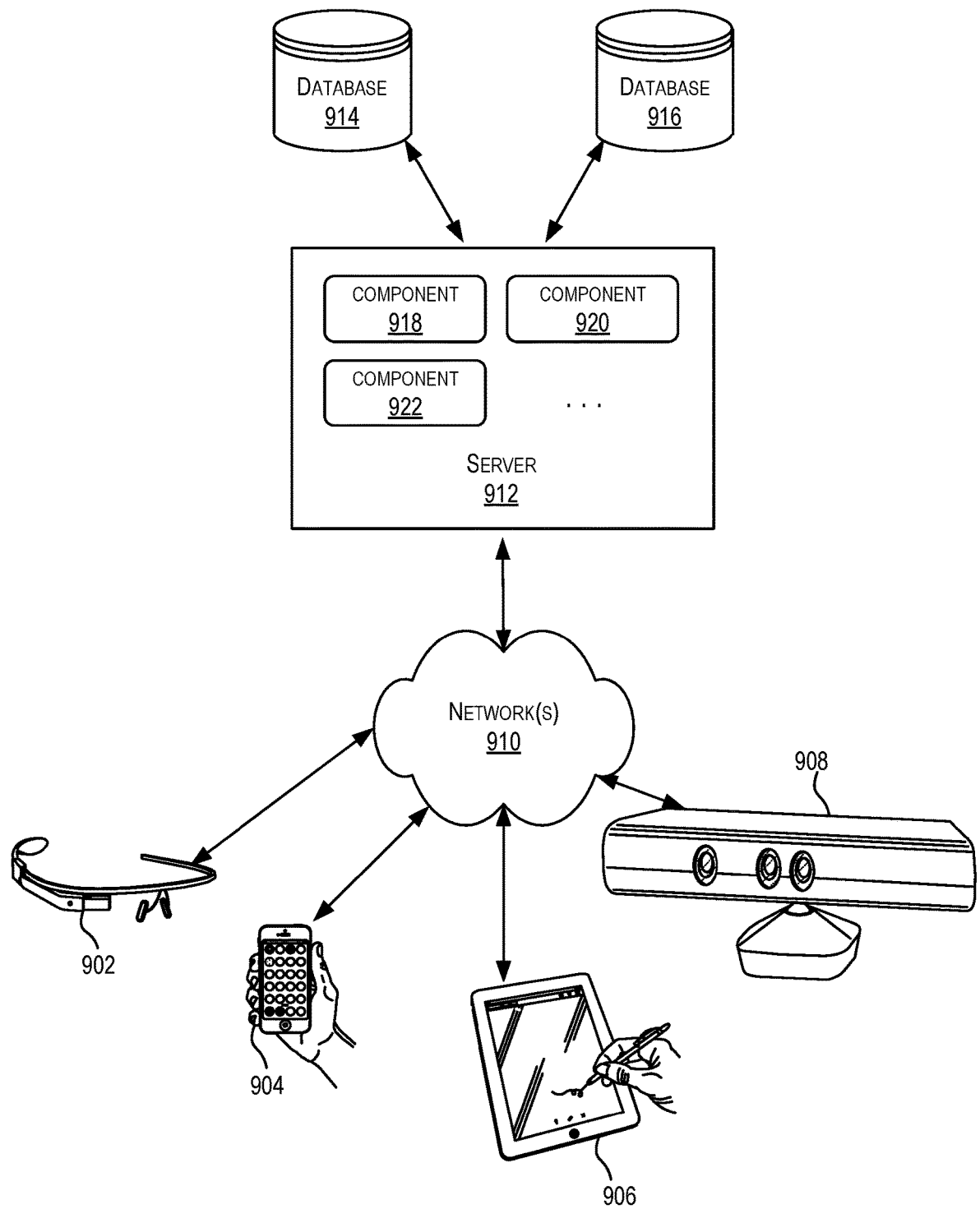
FIG. 9 depicts a simplified diagram of a distributed system for implementing one of the aspects.

FIG. 9 depicts a simplified diagram of a distributed system 900 for implementing one of the aspects. In the illustrated aspect, distributed system 900 includes one or more client computing devices 902, 904, 906, and 908, which are configured to execute and operate a client application such as a web browser, proprietary client (e.g., Oracle Forms), or the like over one or more network(s) 910. Server 912 may be communicatively coupled with remote client computing devices 902, 904, 906, and 908 via network(s) 910.

In various aspects, server 912 may be adapted to run one or more services or software applications provided by one or more of the components of the system. The services or software applications can include non-virtual and virtual environments. Virtual environments can include those used for virtual events, tradeshows, simulators, classrooms, shopping exchanges, and enterprises, whether two- or three-dimensional (3D) representations, page-based logical environments, or otherwise. In some aspects, these services may be offered as web-based or cloud services or under a Software as a Service (SaaS) model to the users of client computing devices 902, 904, 906, and/or 908. Users operating client computing devices 902, 904, 906, and/or 908 may in turn utilize one or more client applications to interact with server 912 to utilize the services provided by these components.

In the configuration depicted in the figure, the software components 918, 920 and 922 of system 900 are shown as being implemented on server 912. In other aspects, one or more of the components of system 900 and/or the services provided by these components may also be implemented by one or more of the client computing devices 902, 904, 906, and/or 908. Users operating the client computing devices may then utilize one or more client applications to use the services provided by these components. These components may be implemented in hardware, firmware, software, or combinations thereof. It should be appreciated that various different system configurations are possible, which may be different from distributed system 900. The aspect shown in the figure is thus one example of a distributed system for implementing an aspect system and is not intended to be limiting.

Client computing devices 902, 904, 906, and/or 908 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 902, 904, 906, and 908 may be any other electronic device, such as a thin-client computer, an Internet-enabled gaming system (e.g., a Microsoft Xbox gaming console with or without a Kinect® gesture input device), and/or a personal messaging device, capable of communicating over network(s) 910.

Although exemplary distributed system 900 is shown with four client computing devices, any number of client computing devices may be supported. Other devices, such as devices with sensors, etc., may interact with server 912.

Network(s) 910 in distributed system 900 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 910 can be a local area network (LAN), such as one based on Ethernet, Token-Ring and/or the like. Network(s) 910 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.6 suite of protocols, Bluetooth®, and/or any other wireless protocol); and/or any combination of these and/or other networks.

Server 912 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 912 can include one or more virtual machines running virtual operating systems, or other computing architectures involving virtualization. One or more flexible pools of logical storage devices can be virtualized to maintain virtual storage devices for the server. Virtual networks can be controlled by server 912 using software defined networking. In various aspects, server 912 may be adapted to run one or more services or software applications described in the foregoing disclosure. For example, server 912 may correspond to a server for performing processing described above in accordance with an aspect of the present disclosure.

Server 912 may run an operating system including any of those discussed above, as well as any commercially available server operating system. Server 912 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include, without limitation, those commercially available from Oracle, Microsoft, Sybase, IBM (International Business Machines), and the like.

In some implementations, server 912 may include one or more applications to analyze and consolidate data feeds and/or event updates received from users of client computing devices 902, 904, 906, and 908. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 912 may also include one or more applications to display the data feeds and/or real-time events via one or more display devices of client computing devices 902, 904, 906, and 908.

Distributed system 900 may also include one or more databases 914 and 916. Databases 914 and 916 may reside in a variety of locations. By way of example, one or more of databases 914 and 916 may reside on a non-transitory storage medium local to (and/or resident in) server 912. Alternatively, databases 914 and 916 may be remote from server 912 and in communication with server 912 via a network-based or dedicated connection. In one set of aspects, databases 914 and 916 may reside in a storage-area network (SAN). Similarly, any necessary files for performing the functions attributed to server 912 may be stored locally on server 912 and/or remotely, as appropriate. In one set of aspects, databases 914 and 916 may include relational databases, such as databases provided by Oracle, that are adapted to store, update, and retrieve data in response to SQL-formatted commands.

Figure 10:
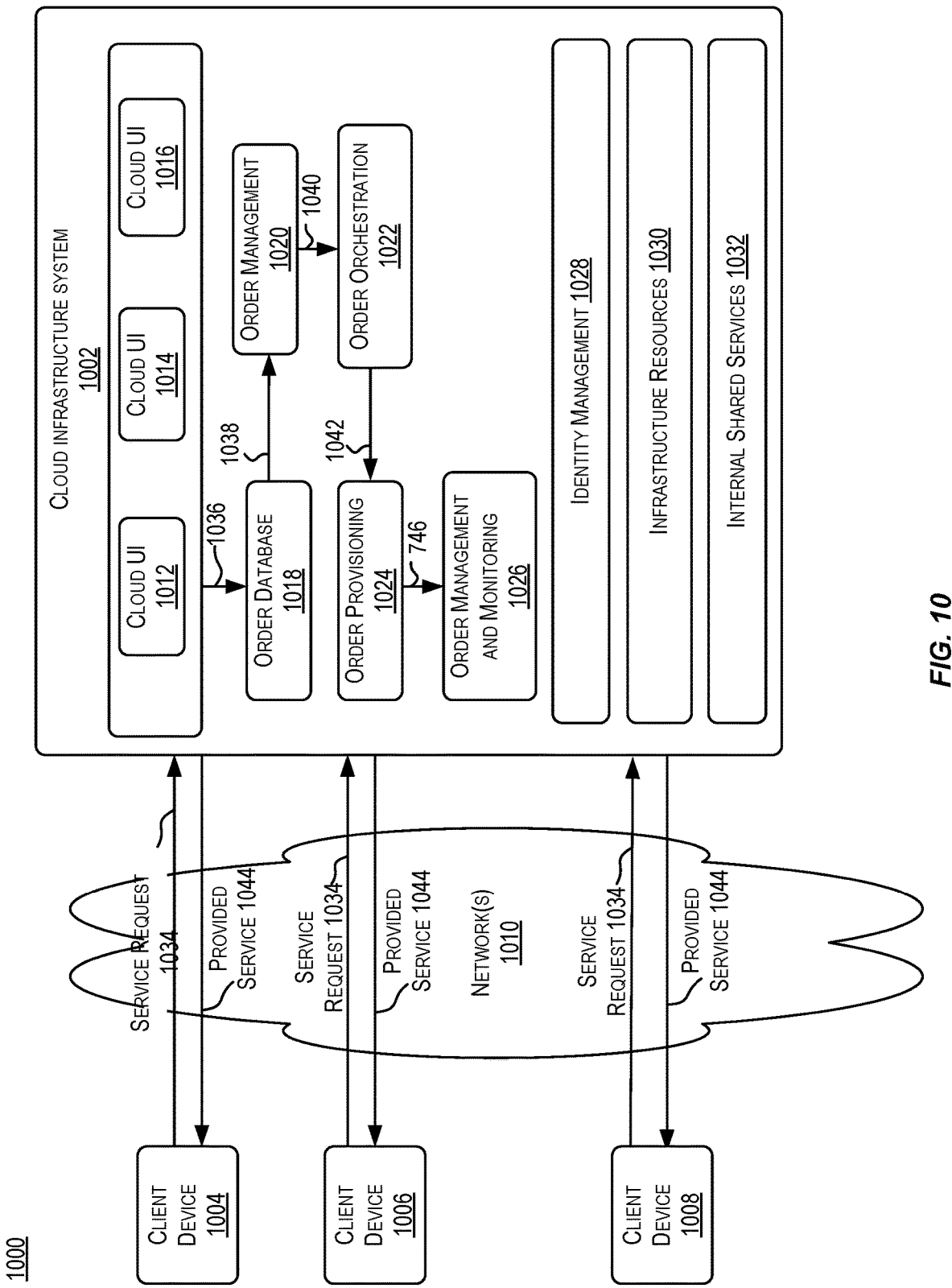
FIG. 10 is a simplified block diagram of components of a system environment by which services provided by the components of an aspect system may be offered as cloud services in accordance with an aspect.

FIG. 10 is a simplified block diagram of one or more components of a system environment 1000 (e.g., a cloud infrastructure system) by which services provided by one or more components of an aspect system may be offered as cloud services, in accordance with an aspect of the present disclosure. In the illustrated aspect, system environment 1000 includes one or more client computing devices 1004, 1006, and 1008 that may be used by users to interact with a cloud infrastructure system 1002 that provides cloud services. The client computing devices may be configured to operate a client application such as a web browser, a proprietary client application (e.g., Oracle Forms), or some other application, which may be used by a user of the client computing device to interact with cloud infrastructure system 1002 to use services provided by cloud infrastructure system 1002.

It should be appreciated that cloud infrastructure system 1002 depicted in the figure may have other components than those depicted. Further, the aspect shown in the figure is only one example of a cloud infrastructure system that may incorporate an aspect of the invention. In some other aspects, cloud infrastructure system 1002 may have more or fewer components than shown in the figure, may combine two or more components, or may have a different configuration or arrangement of components.

Client computing devices 1004, 1006, and 1008 may be devices similar to those described above for 902, 904, 906, and 908 of FIG. 9.

Although exemplary system environment 1000 is shown with three client computing devices, any number of client computing devices may be supported. Other devices such as devices with sensors, etc. may interact with cloud infrastructure system 1002.

Network(s) 1010 may facilitate communications and exchange of data between client computing devices 1004, 1006, and 1008 and cloud infrastructure system 1002. Each network may be any type of network familiar to those skilled in the art that can support data communications using any of a variety of commercially-available protocols, including those described above for network(s) 1010.

Cloud infrastructure system 1002 may comprise one or more computers and/or servers that may include those described above for server 912 of FIG. 9.

In certain aspects, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain aspects, cloud infrastructure system 1002 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Large volumes of data, sometimes referred to as big data, can be hosted and/or manipulated by the infrastructure system on many levels and at different scales. Such data can include data sets that are so large and complex that it can be difficult to process using typical database management tools or traditional data processing applications. For example, terabytes of data may be difficult to store, retrieve, and process using personal computers or their rack-based counterparts. Such sizes of data can be difficult to work with using most current relational database management systems and desktop statistics and visualization packages. They can require massively parallel processing software running thousands of server computers, beyond the structure of commonly used software tools, to capture, curate, manage, and process the data within a tolerable elapsed time.

Extremely large data sets can be stored and manipulated by analysts and researchers to visualize large amounts of data, detect trends, and/or otherwise interact with the data. Tens, hundreds, or thousands of processors linked in parallel can act upon such data in order to present it or simulate external forces on the data or what it represents. These data sets can involve structured data, such as that organized in a database or otherwise in accordance with a structured model, and/or unstructured data (e.g., emails, images, data blobs (binary large objects), web pages, complex event processing). By leveraging an ability of an aspect to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various aspects, cloud infrastructure system 1002 may be adapted to automatically provision, manage and track a customer's subscription to services offered by cloud infrastructure system 1002. Cloud infrastructure system 1002 may provide the cloud services via different deployment models. For example, services may be provided under a public cloud model in which cloud infrastructure system 1002 is owned by an organization selling cloud services (e.g., owned by Oracle) and the services are made available to the general public or different industry enterprises. As another example, services may be provided under a private cloud model in which cloud infrastructure system 1002 is operated solely for a single organization and may provide services for one or more entities within the organization. The cloud services may also be provided under a community cloud model in which cloud infrastructure system 1002 and the services provided by cloud infrastructure system 1002 are shared by several organizations in a related community. The cloud services may also be provided under a hybrid cloud model, which is a combination of two or more different models.

In some aspects, the services provided by cloud infrastructure system 1002 may include one or more services provided under a Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1002. Cloud infrastructure system 1002 then performs processing to provide the services in the customer's subscription order.

In some aspects, the services provided by cloud infrastructure system 1002 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some aspects, platform services may be provided by the cloud infrastructure system via a PaaS platform. The PaaS platform may be configured to provide cloud services that fall under the PaaS category. Examples of platform services may include, without limitation, services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some aspects, platform services provided by the cloud infrastructure system may include database cloud services, middleware cloud services (e.g., Oracle Fusion Middleware services), and Java cloud services. In one aspect, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain aspects, cloud infrastructure system 1002 may also include infrastructure resources 1030 for providing the resources used to provide various services to customers of the cloud infrastructure system. In one aspect, infrastructure resources 1030 may include pre-integrated and optimized combinations of hardware, such as servers, storage, and networking resources to execute the services provided by the PaaS platform and the SaaS platform.

In some aspects, resources in cloud infrastructure system 1002 may be shared by multiple users and dynamically re-allocated per demand. Additionally, resources may be allocated to users in different time zones. For example, cloud infrastructure system 1002 may enable a first set of users in a first time zone to utilize resources of the cloud infrastructure system for a specified number of hours and then enable the re-allocation of the same resources to another set of users located in a different time zone, thereby maximizing the utilization of resources.

In certain aspects, a number of internal shared services 1032 may be provided that are shared by different components or modules of cloud infrastructure system 1002 and by the services provided by cloud infrastructure system 1002. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain aspects, cloud infrastructure system 1002 may provide comprehensive management of cloud services (e.g., SaaS, PaaS, and IaaS services) in the cloud infrastructure system. In one aspect, cloud management functionality may include capabilities for provisioning, managing and tracking a customer's subscription received by cloud infrastructure system 1002, and the like.

In one aspect, as depicted in the figure, cloud management functionality may be provided by one or more modules, such as an order management module 1020, an order orchestration module 1022, an order provisioning module 1024, an order management and monitoring module 1026, and an identity management module 1028. These modules may include or be provided using one or more computers and/or servers, which may be general purpose computers, specialized server computers, server farms, server clusters, or any other appropriate arrangement and/or combination.

In exemplary operation 1034, a customer using a client device, such as client computing devices 1004, 1006 or 1008, may interact with cloud infrastructure system 1002 by requesting one or more services provided by cloud infrastructure system 1002 and placing an order for a subscription for one or more services offered by cloud infrastructure system 1002. In certain aspects, the customer may access a cloud User Interface (UI), cloud UI 1012, cloud UI 1014 and/or cloud UI 1016 and place a subscription order via these UIs. The order information received by cloud infrastructure system 1002 in response to the customer placing an order may include information identifying the customer and one or more services offered by the cloud infrastructure system 1002 in which the customer intends to subscribe.

After an order has been placed by the customer, the order information is received via the cloud UIs, 1012, 1014 and/or 1016.

At operation 1036, the order is stored in order database 1018. Order database 1018 can be one of several databases operated by cloud infrastructure system 1002 and operated in conjunction with other system elements.

At operation 1038, the order information is forwarded to an order management module 1020. In some instances, order management module 1020 may be configured to perform billing and accounting functions related to the order, such as verifying the order, and upon verification, booking the order.

At operation 1040, information regarding the order is communicated to an order orchestration module 1022. Order orchestration module 1022 may utilize the order information to orchestrate the provisioning of services and resources for the order placed by the customer. In some instances, order orchestration module 1022 may orchestrate the provisioning of resources to support the subscribed services using the services of order provisioning module 1024.

In certain aspects, order orchestration module 1022 enables the management of business processes associated with each order and applies business logic to determine whether an order should proceed to provisioning. At operation 1042, upon receiving an order for a new subscription, order orchestration module 1022 sends a request to order provisioning module 1024 to allocate resources and configure those resources needed to fulfill the subscription order. Order provisioning module 1024 enables the allocation of resources for the services ordered by the customer. Order provisioning module 1024 provides a level of abstraction between the cloud services provided by system environment 1000 and the physical implementation layer that is used to provision the resources for providing the requested services. Order orchestration module 1022 may thus be isolated from implementation details, such as whether or not services and resources are actually provisioned on the fly or pre-provisioned and only allocated/assigned upon request.

At operation 1044, once the services and resources are provisioned, a notification of the provided service may be sent to customers on client computing devices 1004, 1006 and/or 1008 by order provisioning module 1024 of cloud infrastructure system 1002.

At operation 1046, the customer's subscription order may be managed and tracked by an order management and monitoring module 1026. In some instances, order management and monitoring module 1026 may be configured to collect usage statistics for the services in the subscription order, such as the amount of storage used, the amount data transferred, the number of users, and the amount of system up time and system down time.

In certain aspects, system environment 1000 may include an identity management module 1028. Identity management module 1028 may be configured to provide identity services, such as access management and authorization services in system environment 1000. In some aspects, identity management module 1028 may control information about customers who wish to utilize the services provided by cloud infrastructure system 1002. Such information can include information that authenticates the identities of such customers and information that describes which actions those customers are authorized to perform relative to various system resources (e.g., files, directories, applications, communication ports, memory segments, etc.). Identity management module 1028 may also include the management of descriptive information about each customer and about how and by whom that descriptive information can be accessed and modified.

Figure 11:
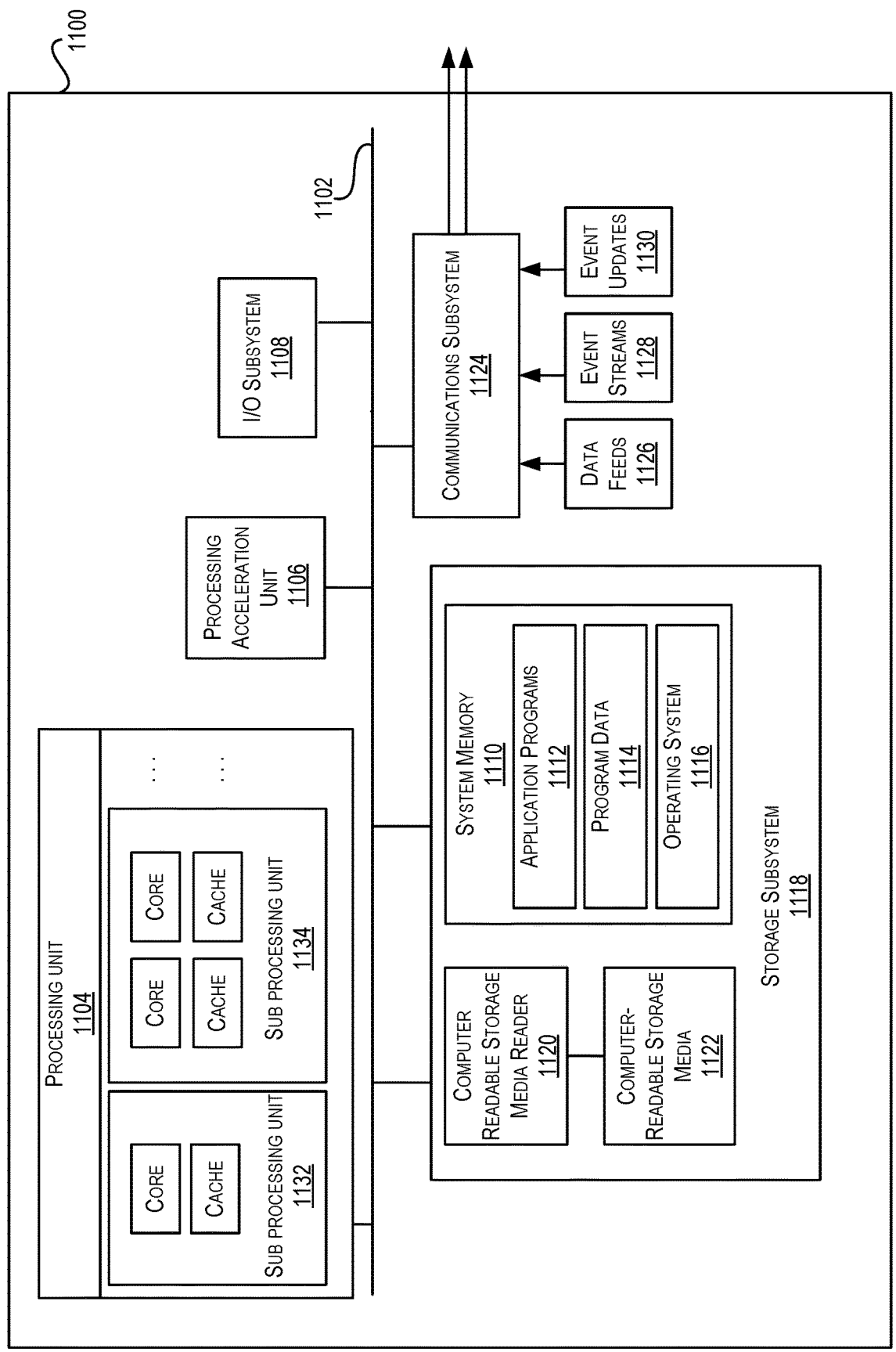
FIG. 11 illustrates an exemplary computer system, in which various aspects may be implemented.

FIG. 11 illustrates an exemplary computer system 1100, in which various aspects may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative aspects of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P886.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain aspects, processing unit 1104 may be implemented as one or more independent processing units 1132 and/or 1134 with single or multicore processors included in each processing unit. In other aspects, processing unit 1104 may also be implemented as a quad-core processing unit formed by integrating two dual-core processors into a single chip.

In various aspects, processing unit 1104 can execute a variety of programs in response to program code and can maintain multiple concurrently executing programs or processes. At any given time, some or all of the program code to be executed can be resident in processing unit 1104 and/or in storage subsystem 1118. Through suitable programming, processing unit 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that comprises software elements, shown as being currently located within a system memory 1110. System memory 1110 may store program instructions that are loadable and executable on processing unit 1104, as well as data generated during the execution of these programs.

Depending on the configuration and type of computer system 1100, system memory 1110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1104. In some implementations, system memory 1110 may include multiple different types of memory, such as static random access memory (SRAM) or dynamic random access memory (DRAM). In some implementations, a basic input/output system (BIOS), containing the basic routines that help to transfer information between elements within computer system 1100, such as during start-up, may typically be stored in the ROM. By way of example, and not limitation, system memory 1110 also illustrates application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1118 may also provide a tangible computer-readable storage medium for storing the basic programming and data constructs that provide the functionality of some aspects. Software (programs, code modules, instructions) that when executed by a processor provide the functionality described above, may be stored in storage subsystem 1118. These software modules or instructions may be executed by processing unit 1104. Storage subsystem 1118 may also provide a repository for storing data used in accordance with the present invention.

Storage subsystem 1118 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for temporarily and/or more permanently containing, storing, transmitting, and retrieving computer-readable information.

Computer-readable storage media 1122 containing code, or portions of code, can also include any appropriate media known or used in the art, including storage media and communication media such as, but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computing system 1100.

By way of example, computer-readable storage media 1122 may include a hard disk drive that reads from or writes to non-removable, non-volatile magnetic media, a magnetic disk drive that reads from or writes to a removable, non-volatile magnetic disk, and an optical disk drive that reads from or writes to a removable, non-volatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some aspects, communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.28 family standards, or other mobile communication technologies, or any combination thereof), global positioning system (GPS) receiver components, and/or other components. In some aspects, communications subsystem 1124 can provide wired network connectivity (e.g., Ethernet) in addition to or instead of a wireless interface.

In some aspects, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive unstructured data feeds 1126 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various aspects.

In the foregoing specification, aspects of the invention are described with reference to specific aspects thereof, but those skilled in the art will recognize that the invention is not limited thereto. Various attributes and aspects of the above-described invention may be used individually or jointly. Further, aspects can be utilized in any number of environments and applications beyond those described herein without departing from the broader spirit and scope of the specification. The specification and drawings are, accordingly, to be regarded as illustrative rather than restrictive.

What is claimed is:

1. A method of generating an automated answer to a question, the method comprising:
   generating a plurality of summarized logical forms for text of an answer, the plurality of summarized logical forms comprising:
      a first summarized logical form comprising a first syntactically-generalized representation provided in first-order logic and expressing a corresponding main topic of a portion of the text; and
      a second summarized logical form representing a second syntactically-generalized representation provided in first-order logic and representing one or more potential questions generated from and answered by the text;
   associating a search index corresponding to the text of the answer with the plurality of summarized logical forms;
   receiving a natural language query comprising the question;
   generating a representation of the natural language query based at least in part on converting the natural language query to logical form, the representation of the natural language query comprising at least one logical predicate and a plurality of variables that express the natural language query in first-order logic;
   matching the natural language query to at least one of the plurality of summarized logical forms of the search index associated with the text, the matching being performed based at least in part on comparing the first-order logic of the representation of the natural language query to first-order logic of one or more of the plurality of summarized logical forms of the search index; and
   providing the text of the answer in response to the question based at least in part on matching the representation of the natural language query to at least one of the plurality of summarized logical forms.

2. The method of claim 1, wherein generating the plurality of summarized logical forms further comprises at least one of:
   generating the first summarized logical form based at least in part on generating an abstract meaning representation of the text, the abstract meaning representation comprising a directed acyclic graph comprising a plurality of nodes and edges that specify a semantic representation of the text;

generating the second summarized logical form based at least in part on generating a discourse tree from the text, the discourse tree comprising a set of nodes and edges that specify a rhetorical relationship between clauses of the text; or generating a third summarized logical form based at least in part on one or more generalizations of one or more portions of the text.

3. The method of claim 2, wherein the plurality of summarized logical forms further identify a corresponding portion of the text that is essential to the answer.

4. The method of claim 1, wherein generating the plurality of summarized logical forms further comprises:

generating a first abstract meaning representation of a first portion of the text, the first abstract meaning representation comprising a first directed acyclic graph comprising a first plurality of nodes and edges that specify a first semantic representation of the first portion of the text;

generating a second abstract meaning representation of a second portion of the text, the second abstract meaning representation comprising a second directed acyclic graph comprising a second plurality of nodes and edges that specify a second semantic representation of the second portion of the text;

comparing the first abstract meaning representation and the second abstract meaning representation; and identifying a common portion between the first abstract meaning representation of the first portion of the text and the second abstract meaning representation, wherein the first summarized logical form is generated based at least in part on identifying the common portion between the first abstract meaning representation of the first portion of the text and the second abstract meaning representation.

5. The method of claim 4, further comprising deriving the one or more potential questions generated from and answered by the text from the common portion identified between the first abstract meaning representation and the second abstract meaning representation, wherein the second summarized logical form is generated based at least in part on the one or more potential questions derived from the common portion identified between the first abstract meaning representation and the second abstract meaning representation.

6. The method of claim 1, wherein generating the at least one summarized logical form further comprises:

generating a discourse tree of the text, the discourse tree comprising a set of nodes and edges that specify a rhetorical relationship between clauses of the text;

providing the discourse tree as input to a machine-learning classifier, the machine-learning classifier having been previously trained to identify portions of text that are suitable for adding to a corresponding search index associated with the text, the machine-learning classifier being trained to identify the portions of text from input discourse trees based at least in part on a training set comprising text examples for which index suitability for corresponding text portions are known; and generating the at least one summarized logical form based at least in part on output provided by the machine-learning classifier.

7. The method of claim 1, wherein generating at least one summarized logical form of the plurality of summarized logical forms further comprises:

performing a pair-wise comparison of pairs of generalizations of the text to identify one or more common terms; and generating the at least one summarized logical form based at least in part on the one or more common terms.

8. A computing device configured to generate an automated answer to a question, the computing device comprising:

a computer-readable medium storing non-transitory computer-executable program instructions; and a processing device communicatively coupled to the computer-readable medium for executing the non-transitory computer-executable program instructions, wherein executing the non-transitory computer-executable program instructions with the processing device causes the computing device to perform operations comprising:

generating a plurality of summarized logical forms for text of an answer, the plurality of summarized logical forms comprising:

a first summarized logical form comprising a first syntactically-generalized representation provided in first-order logic and expressing a corresponding main topic of a portion of the text; and a second summarized logical form representing a second syntactically-generalized representation provided in first-order logic and representing one or more potential questions generated from and answered by the text;

associating a search index corresponding to the text of the answer with the plurality of summarized logical forms;

receiving a natural language query comprising the question;

generating a representation of the natural language query based at least in part on converting the natural language query to logical form, the representation of the natural language query comprising at least one logical predicate and a plurality of variables that express the natural language query in first-order logic;

matching the natural language query to at least one of the plurality of summarized logical forms of the search index associated with the text, the matching being performed based at least in part on comparing the first-order logic of the representation of the natural language query to first-order logic of one or more of the plurality of summarized logical forms of the search index; and providing the text of the answer in response to the question based at least in part on matching the representation of the natural language query to at least one of the plurality of summarized logical forms.

9. The computing device of claim 8, wherein generating the plurality of summarized logical forms further comprises at least one of:

generating the first summarized logical form based at least in part on generating an abstract meaning representation of the text, the abstract meaning representation comprising a directed acyclic graph comprising a plurality of nodes and edges that specify a semantic representation of the text;

generating the second summarized logical form based at least in part on generating a discourse tree from the text, the discourse tree comprising a set of nodes and edges that specify a rhetorical relationship between clauses of the text; or generating a third summarized logical form based at least in part on one or more generalizations of one or more portions of the text.

10. The computing device of claim 8, wherein generating the plurality of summarized logical forms further comprises:
generating a first abstract meaning representation of a first portion of the text, the first abstract meaning representation comprising a first directed acyclic graph comprising a first plurality of nodes and edges that specify a first semantic representation of the first portion of the text;
generating a second abstract meaning representation of a second portion of the text, the second abstract meaning representation comprising a second directed acyclic graph comprising a second plurality of nodes and edges that specify a second semantic representation of the second portion of the text;
comparing the first abstract meaning representation and the second abstract meaning representation; and
identifying a common portion between the first abstract meaning representation of the first portion of the text and the second abstract meaning representation, wherein the first summarized logical form is generated based at least in part on identifying the common portion between the first abstract meaning representation of the first portion of the text and the second abstract meaning representation.

11. The computing device of claim 10, wherein the operations further comprise deriving the one or more potential questions generated from and answered by the text from the common portion identified between the first abstract meaning representation and the second abstract meaning representation, wherein the second summarized logical form is generated based at least in part on the one or more potential questions derived from the common portion identified between the first abstract meaning representation and the second abstract meaning representation.

12. The computing device of claim 8, wherein generating at least one summarized logical form of the plurality of summarized logical forms comprises:
generating a discourse tree of the text, the discourse tree comprising a set of nodes and edges that specify a rhetorical relationship between clauses of the text;
providing the discourse tree as input to a machine-learning classifier, the machine-learning classifier having been previously trained to identify portions of text that are suitable for adding to a corresponding search index associated with the text, the machine-learning classifier being trained to identify the portions of text from input discourse trees based at least in part on a training set comprising text examples for which index suitability for corresponding text portions are known; and
generating the at least one summarized logical form based at least in part on output provided by the machine-learning classifier.

13. The computing device of claim 8, wherein generating at least one summarized logical form of the plurality of summarized logical forms further comprises:
performing a pair-wise comparison of pairs of generalizations of the text to identify one or more common terms; and
generating the at least one summarized logical form based at least in part on the one or more common terms.

14. A non-transitory computer-readable storage medium storing computer-executable program instructions for generating an automated answer to a question, wherein when executed by a processing device, the program instructions cause the processing device to perform operations comprising:
generating a plurality of summarized logical forms for text of an answer, the plurality of summarized logical forms comprising:
a first summarized logical form comprising a first syntactically-generalized representation provided in first-order logic and expressing a corresponding main topic of a portion of the text; and
a second summarized logical form representing a second syntactically-generalized representation provided in first order logic and representing one or more potential questions generated from and answered by the text;
associating a search index corresponding to the text of the answer with the plurality of summarized logical forms;
receiving a natural language query comprising the question;
generating a representation of the natural language query based at least in part on converting the natural language query to logical form, the representation of the natural language query comprising at least one logical predicate and a plurality of variables that express the natural language query in first-order logic;
matching the natural language query to at least one of the plurality of summarized logical forms of the search index associated with the text, the matching being performed based at least in part on comparing the first-order logic of the representation of the natural language query to first-order logic of one or more of the plurality of summarized logical forms of the search index; and
providing the text of the answer in response to the question based at least in part on matching the representation of the natural language query to at least one of the plurality of summarized logical forms.

15. The non-transitory computer-readable storage medium of claim 14, wherein generating the plurality of summarized logical forms further comprises at least one of:
generating the first summarized logical form based at least in part on generating an abstract meaning representation of the text, the abstract meaning representation comprising a directed acyclic graph comprising a plurality of nodes and edges that specify a semantic representation of the text;
generating the second summarized logical form based at least in part on generating a discourse tree from the text, the discourse tree comprising a set of nodes and edges that specify a rhetorical relationship between clauses of the text; or
generating a third summarized logical form based at least in part on one or more generalizations of one or more portions of the text.

16. The non-transitory computer-readable storage medium of claim 14, wherein generating the plurality of summarized logical forms further comprises:
generating a first abstract meaning representation of a first portion of the text, the first abstract meaning representation comprising a first directed acyclic graph comprising a first plurality of nodes and edges that specify a first semantic representation of the first portion of the text;

generating a second abstract meaning representation of a second portion of the text, the second abstract meaning representation comprising a second directed acyclic graph comprising a second plurality of nodes and edges that specify a second semantic representation of the second portion of the text;

comparing the first abstract meaning representation and the second abstract meaning representation; and identifying a common portion between the first abstract meaning representation of the first portion of the text and the second abstract meaning representation, wherein the first summarized logical form is generated based at least in part on identifying the common portion between the first abstract meaning representation of the first portion of the text and the second abstract meaning representation; and deriving one or more questions from the common portion identified between the first abstract meaning representation and the second abstract meaning representation, wherein the second summarized logical form is generated based at least in part on the one or more questions derived from the common portion identified between the first abstract meaning representation and the second abstract meaning representation.

17. The non-transitory computer-readable storage medium of claim 14, wherein generating at least one summarized logical form of the plurality of summarized logical forms further comprises:

performing a pair-wise comparison of pairs of generalizations of the text to identify one or more common terms; and generating the at least one summarized logical form based at least in part on the one or more common terms.

* * * * *